United States Patent
Takeda et al.

(10) Patent No.: US 7,639,329 B2
(45) Date of Patent: Dec. 29, 2009

(54) LIQUID CRYSTAL PANEL AND LIQUID CRYSTAL DISPLAY APPARATUS

(75) Inventors: Kentarou Takeda, Osaka (JP); Takeharu Kitagawa, Osaka (JP); Daisuke Hayashi, Osaka (JP); Hideki Ishida, Osaka (JP); Nao Murakami, Osaka (JP); Junichi Nagase, Osaka (JP)

(73) Assignee: Nitto Denko Corporation, Ibaraki-shi (JP)

(*) Notice: Subject to any disclaimer, the term of this patent is extended or adjusted under 35 U.S.C. 154(b) by 100 days.

(21) Appl. No.: 12/113,515

(22) Filed: May 1, 2008

(65) Prior Publication Data

US 2008/0273153 A1    Nov. 6, 2008

(30) Foreign Application Priority Data

May 1, 2007 (JP) ............................. 2007-120633
Jun. 4, 2007 (JP) ............................. 2007-148256
Nov. 16, 2007 (JP) ............................. 2007-298072

(51) Int. Cl.
G02F 1/13363    (2006.01)
(52) U.S. Cl. ................... 349/117; 349/118; 349/119
(58) Field of Classification Search .............. 349/117
See application file for complete search history.

(56) References Cited

U.S. PATENT DOCUMENTS

2006/0158593 A1* 7/2006 Sakai et al. ............. 349/122
2006/0177607 A1* 8/2006 Ohmori et al. ........... 428/1.31
2006/0238681 A1* 10/2006 Murakami et al. ........ 349/117
2007/0040963 A1* 2/2007 Maruyama et al. ........ 349/96
2008/0204644 A1* 8/2008 Toyama et al. ........... 349/118
2008/0273153 A1* 11/2008 Takeda et al. ............ 349/118

FOREIGN PATENT DOCUMENTS

JP    11-95208 A    4/1999

* cited by examiner

*Primary Examiner*—Frank G Font
*Assistant Examiner*—Erin D Chiem
(74) *Attorney, Agent, or Firm*—Westerman, Hattori, Daniels & Adrian, LLP

(57) ABSTRACT

The liquid crystal panel according to an embodiment of the present invention includes, in the stated order from a viewer side: a first polarizer; a first optical compensation layer; a liquid crystal cell; a second optical compensation layer; and a second polarizer, wherein:

the first optical compensation layer has an absolute value of a photoelastic coefficient of $40\times10^{-12}$ (m²/N) or less, has an in-plane retardation $\Delta$nd of 90 nm to 200 nm, has relationships of the following Expressions (1) and (2), and functions as a protective layer on a liquid crystal cell side of the first polarizer; and the second optical compensation layer has relationships of the following Expressions (3) and (4), $$\Delta nd(380)=\Delta nd(550)=\Delta nd(780) \quad (1)$$

$$nx>ny>nz \quad (2)$$

$$Rth(380)>Rth(550)>Rth(780) \quad (3)$$

$$nx=ny>nz \quad (4).$$

11 Claims, 15 Drawing Sheets

| EXAMPLE 1 | COMPARATIVE EXAMPLE 4 |

IN-PLANE BRIGHTNESS DISTRIBUTION

LIQUID CRYSTAL PANEL AND LIQUID CRYSTAL DISPLAY APPARATUS

This application claims priority under 35 U.S.C. Section 119 to Japanese Patent Application No. 2007-120633 filed on May 1, 2007, Japanese Patent Application No. 2007-148256 filed on Jun. 4, 2007, and Japanese Patent Application No. 2007-298072 filed on Nov. 16, 2007, which are herein incorporated by references.

BACKGROUND OF THE INVENTION

1. Field of the Invention

The present invention relates to a liquid crystal panel and to a liquid crystal display apparatus. In particular, the present invention relates to a liquid crystal panel suitable for a liquid crystal display apparatus and capable of providing a neutral display having no color shift in all azimuth angle directions, and to a liquid crystal display apparatus using the liquid crystal panel.

2. Description of the Related Art

FIG. 5A is a schematic cross-sectional view of a conventional typical liquid crystal display apparatus, and FIG. 5B is a schematic cross-sectional view of a liquid crystal cell used in the liquid crystal display apparatus. A liquid crystal display apparatus 900 includes a liquid crystal cell 910, retardation plates 920, 920' placed on outer sides of the liquid crystal cell 910, and polarizing plates 930, 930' placed on outer sides of the retardation plates 920, 920'. Typically, the polarizing plates 930, 930' are placed so that absorption axes thereof are perpendicular to each other. The liquid crystal cell 910 includes a pair of substrates 911, 911', and a liquid crystal layer 912 as a display medium placed between the substrates. One substrate 911 is provided with switching elements (typically, TFTs) controlling the electrooptical properties of liquid crystal, and scanning lines that supply a gate signal to the switching elements and signal lines that supply a source signal to the switching elements (not shown). The other substrate 911' is provided with color layers 913R, 913G, 913B constituting a color filter, and a light-shielding layer (black matrix layer) 914. The interval (cell gap) between the substrates 911, 911' is controlled with spacers (not shown).

The retardation plates are used for the purpose of optical compensation of a liquid crystal display apparatus. In order to obtain optimum optical compensation (for example, the improvement of viewing angle properties, the improvement of a color shift, and the improvement of a contrast), various attempts have been made with respect to the optimization of the optical properties of the retardation plates and/or the arrangement in the liquid crystal display apparatus. Conventionally, as shown in FIG. 5A, one retardation plate is placed between the liquid crystal cell 910 and the polarizing plate 930, and between the liquid crystal cell 910 and the polarizing plate 930' (for example, see JP 11-95208 A).

Along with the recent increase in definition and function of a liquid crystal display apparatus, there is a further demand for the enhancement of uniformity and display quality of a screen. However, in a conventional liquid crystal display apparatus, it is difficult to express a neutral display having no color shift in all azimuth angle directions. Further, along with the miniaturization and the increase in portability of a liquid crystal display apparatus, a demand for the reduction in thickness is also increasing.

SUMMARY OF THE INVENTION

The present invention has been made in order to solve the above conventional problems, and therefore it is an object of the present invention to provide a liquid crystal panel suitable for a liquid crystal display apparatus and capable of providing a neutral display having no color shift in all azimuth angle directions, and a liquid crystal display apparatus using the liquid crystal panel.

A liquid crystal panel according to an embodiment of the present invention includes, in the stated order from a viewer side:

a first polarizer;
a first optical compensation layer;
a liquid crystal cell;
a second optical compensation layer; and
a second polarizer, wherein:
the first optical compensation layer has an absolute value of a photoelastic coefficient of $40 \times 10^{-12}$ (m$^2$/N) or less, has an in-plane retardation $\Delta$nd of 90 nm to 200 nm, has relationships of the following Expressions (1) and (2), and functions as a protective layer on a liquid crystal cell side of the first polarizer; and
the second optical compensation layer has relationships of the following Expressions (3) and (4), $$\Delta\text{nd}(380)=\Delta\text{nd}(550)=\Delta\text{nd}(780) \quad (1)$$

$$\text{nx} > \text{ny} \geq \text{nz} \quad (2)$$

$$\text{Rth}(380) > \text{Rth}(550) > \text{Rth}(780) \quad (3)$$

$$\text{nx} = \text{ny} > \text{nz} \quad (4).$$

In a preferred embodiment of the present invention, the first optical compensation layer has a difference between a maximum value and a minimum value of $\Delta$nd at a wavelength of 380 nm to 780 nm of 10 nm or less.

In a preferred embodiment of the present invention, the first optical compensation layer has an Nz coefficient in a range of 1.1 to 3.0.

In a preferred embodiment of the present invention, the first optical compensation layer has an Nz coefficient of more than 0.9 and less than 1.1.

In a preferred embodiment of the present invention, the first optical compensation layer is a film containing a cyclic olefin-based resin.

In a preferred embodiment of the present invention, the film containing the cyclic olefin-based resin is produced by fixed-end uniaxial stretching.

In a preferred embodiment of the present invention, the second optical compensation layer contains at least one non-liquid crystal material selected from a group consisting of polyamide, polyimide, polyester, polyetherketone, polyamideimide, and polyesterimide.

In a preferred embodiment of the present invention, the first optical compensation layer and the first polarizer are attached to each other with a water-soluble adhesive containing a polyvinyl alcohol-based resin.

In a preferred embodiment of the present invention, the water-soluble adhesive contains a metal compound colloid.

In a preferred embodiment of the present invention, the liquid crystal cell has a drive mode of one of a VA mode and an OCD mode.

According to another aspect of the present invention, a liquid crystal display apparatus is provided. The liquid crystal display apparatus of the present invention includes a liquid crystal panel as described above.

According to the present invention, there are provided a liquid crystal panel suitable for a liquid crystal display apparatus and capable of providing a neutral display having no color shift in all azimuth angle directions, and a liquid crystal display apparatus using the liquid crystal panel. Such effects are exhibited remarkably by combining a first optical compensation layer having so-called flat wavelength dispersion properties, a very small photoelastic coefficient, and a refractive index profile of $nx>ny \geqq nz$ with a second optical compensation layer having a refractive index profile of $nx=ny>nz$ and wavelength dispersion properties in which a thickness direction retardation decreases with an increase in wavelength. Further, according to the present invention, the first optical compensation layer can function as a protective layer on a liquid crystal cell side of one polarizer, which can contribute to the reduction in thickness of a liquid crystal display apparatus.

DETAILED DESCRIPTION OF THE PREFERRED EMBODIMENTS (Definitions of Terms and Symbols)

The definitions of terms and symbols used in the present specification are as follows.

(1) "nx" denotes a refractive index in a direction (i.e., a slow axis direction) in which a refractive index in a plane is maximum, "ny" denotes a refractive index in a direction perpendicular to the slow axis in the same plane, and "nz" denotes a refractive index in a thickness direction. Further, the expression "nx=ny", for example, not only refers to a case where nx and ny are exactly equal but also includes a case where nx and ny are substantially equal. In the specification of the present invention, the phrase "substantially equal" includes a case where nx and ny differ within a range providing no effects on overall display properties of a liquid crystal panel (ultimately, a liquid crystal display apparatus) in practical use.

(2) The term "in-plane retardation $\Delta nd(\lambda)$" refers to an in-plane retardation value of a film (layer) measured at 23° C. by using light of a wavelength of $\lambda$ nm. $\Delta nd(\lambda)$ can be determined from an equation $\Delta nd(\lambda)=(nx-ny) \times d$, where nx and ny represent refractive indices of a film (layer) at a wavelength of $\lambda$ nm in a slow axis direction and a fast axis direction, respectively, and d (nm) represents a thickness of the film (layer). Note that in the case where the in-plane retardation is described simply $\Delta nd$, $\Delta nd$ means in-plane retardation measured with light having a wavelength of 590 nm.

(3) A thickness direction retardation $Rth(\lambda)$ refers to a retardation value in a thickness direction measured with light having a wavelength of $\lambda$ nm at 23° C. Rth is obtained by an expression: $Rth=(nx-nz) \times d$, where nx is a refractive index in a slow axis direction of a film (layer), nz is a refractive index in a thickness direction thereof at a wavelength of $\lambda$ nm, and d (nm) is the thickness of a film (layer). Note that in the case where the thickness direction retardation is described simply Rth, Rth means thickness direction retardation measured with light having a wavelength of 590 nm.

(4) An Nz coefficient refers to a ratio of in-plane retardation $\Delta nd$ thickness direction retardation Rth and is determined by an expression: $Nz=(nx-nz)/(nx-ny)$.

Figure 1:
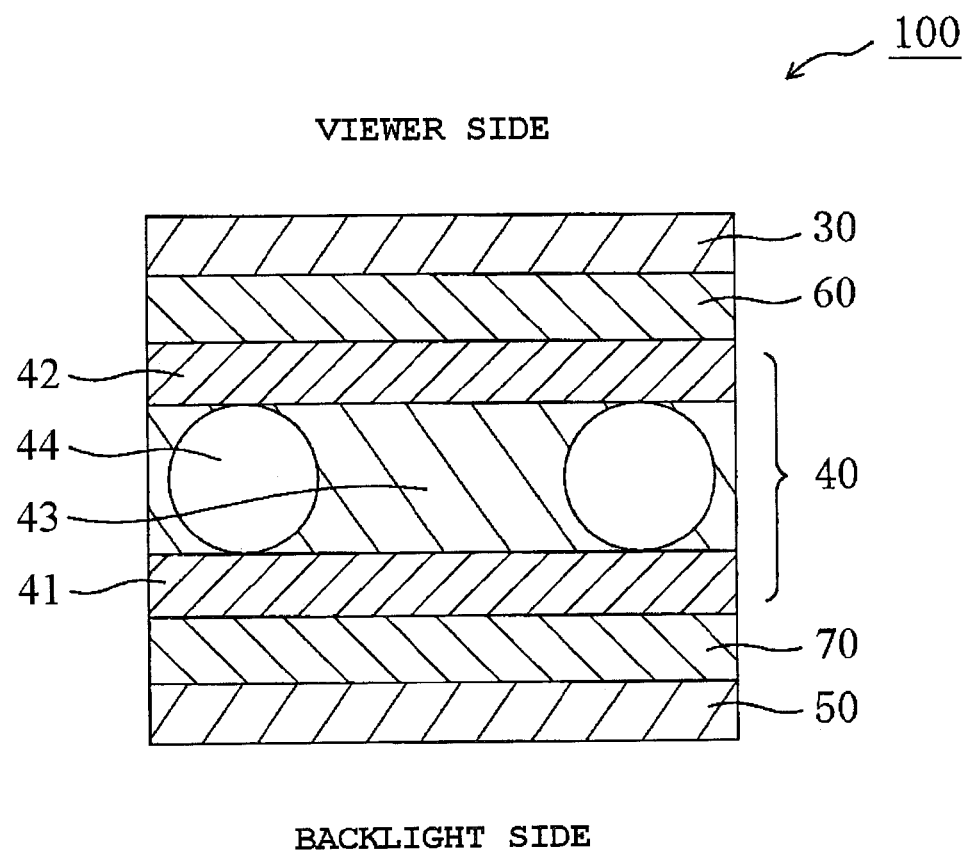
FIG. 1 is a schematic cross-sectional view of a liquid crystal panel according to a preferred embodiment of the present invention.

A. Configuration of a Liquid Crystal Panel and a Liquid Crystal Display Apparatus Including the Liquid Crystal Panel FIG. 1 is a schematic cross-sectional view illustrating a preferred example of a liquid crystal panel of the present invention. The liquid crystal panel 100 includes a first polarizer 30, a first optical compensation layer 60, a liquid crystal cell 40, a second optical compensation layer 70, and a second polarizer 50. Both of the first optical compensation layer 60 and the second optical compensation layer 70 may be placed on one side (i.e., the viewer side or the backlight side) of a liquid crystal cell, or one of them may be placed on the backlight side and the other may be placed on the viewer side. Preferably, as shown in FIG. 1, the first optical compensation layer 60 is placed on the viewer side, and the second optical compensation layer 70 is placed on the backlight side. The first polarizer and the second polarizer may each have a protective layer at least on one side (not shown). In the liquid crystal panel of the present invention, the first optical compensation layer 60 functions as a protective layer on the liquid crystal cell side of one polarizer (in the illustrated example, the first polarizer 30), so the protective layer at that position may be omitted. The optical compensation layers, the polarizers, and the liquid crystal cell are attached to each other via any suitable pressure-sensitive adhesive layer or adhesive layer.

The first optical compensation layer 60 has an absolute value of a photoelastic coefficient of $40 \times 10^{-12}$ ($m^2/N$) or less, an in-plane retardation $\Delta nd$ of 90 nm to 200 nm, and relationships of the following Expressions (1) and (2), and functions as a protective layer on the liquid crystal cell side of one polarizer as described above. The second optical compensation layer 70 has relationships of the following Expressions (3) and (4).

$$\Delta nd(380)=\Delta nd(550)=\Delta nd(780) \quad (1)$$

$$nx>ny \geq nz \quad (2)$$

$$Rth(380)>Rth(550)>Rth(780) \quad (3)$$

$$nx=ny>nz \quad (4)$$

The first optical compensation layer 60 is preferably placed so that a slow axis thereof is substantially perpendicular to an absorption axis of an adjacent polarizer (in the illustrated example, the first polarizer). The detail of the first optical compensation layer 60 and the second optical compensation layer 70 will be described later.

An absorption axis of the first polarizer 30 and an absorption axis of the second polarizer 50 are preferably substantially perpendicular to each other.

The liquid crystal cell 40 includes a pair of glass substrates 41, 42 and a liquid crystal layer 43 as a display medium placed between the substrates. On one substrate (active matrix substrate) 41, switching elements (typically, TFT) for controlling the electrooptical characteristics of liquid crystal; scanning lines that provide a gate signal to the switching elements; signal lines that give a source signal thereto are provided (all not shown). On the other substrate (color filter substrate) 42, a color filter (not shown) are provided. The color filter may be provided on the active matrix substrate 41. The gap (cell gap) between the substrates 41 and 42 is controlled with spacers 44. The cell gap is preferably 2 μm to 10 μm, more preferably 3 μm to 9 μm, and most preferably 4 μm to 8 μm. If the cell gap is in the above range, a response time can be shortened, whereby satisfactory display characteristics can be obtained. On each side of the substrates 41 and 42, which is in contact with the liquid crystal layer 43, an alignment film (not shown) made of, for example, polyimide is provided.

A drive mode of the liquid crystal cell 40 may employ any suitable drive modes as long as the effects of the present invention can be provided. Specific examples of the drive mode include a super twisted nematic (STN) mode, a twisted nematic (TN) mode, an in-plane switching (IPS) mode, a vertical aligned (VA) mode, an optically compensated birefringence (OCB) mode, a hybrid aligned nematic (HAN) mode, and an axially symmetric aligned microcell (ASM) mode. Of those, a VA mode and an OCB mode are preferred because a color shift is significantly improved.

Figure 2A:
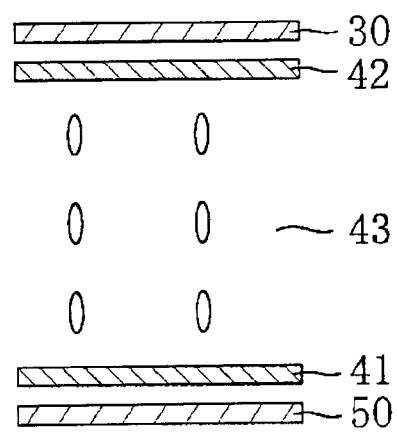
FIGS. 2A and 2B are schematic cross-sectional views illustrating an alignment state of liquid crystal molecules in a liquid crystal layer in the case where a liquid crystal display apparatus of the present invention adopts a liquid crystal cell of a VA mode.
Figure 2B:
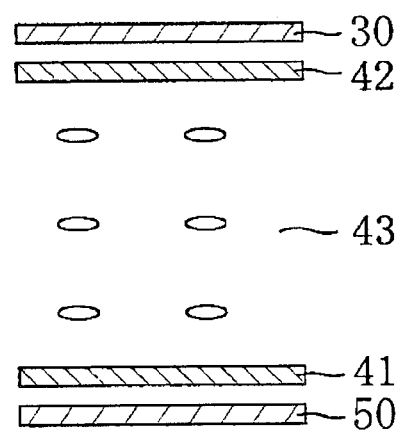

FIGS. 2A and 2B are each a schematic sectional view illustrating an alignment state of liquid crystal molecules in a VA mode. As shown in FIG. 2A, liquid crystal molecules are aligned vertically to the substrates 41 and 42 without application of a voltage. Such vertical alignment is realized by arranging nematic liquid crystal having negative dielectric anisotropy between the substrates each having a vertical alignment film formed thereon (not shown). When light enters the liquid crystal layer 43 in such a state from a surface of one substrate 41, linearly polarized light having passed through the second polarizer 50 and entering the liquid crystal layer 43 advances along a longitudinal direction of the vertically aligned liquid crystal molecules. No birefringence occurs in the longitudinal direction of the liquid crystal molecules, and thus the incident light advances without changing a polarization direction and is absorbed by the first polarizer 30 having an absorption axis perpendicular to the second polarizer 50. In this way, a dark state is displayed without application of a voltage (normally black mode). As shown in FIG. 2B, longitudinal axes of the liquid crystal molecules orientate parallel to the substrate surfaces when a voltage is applied between the electrodes. The liquid crystal molecules exhibit birefringence with linearly polarized light entering the liquid crystal layer 43 in such a state, and a polarization state of the incident light changes in accordance with inclination of the liquid crystal molecules. Light passing through the liquid crystal layer during application of a predetermined maximum voltage is converted into linearly polarized light having a polarization direction rotated by 90°, for example. Thus, the light passes through the first polarizer 30, and a bright state is displayed. Upon termination of voltage application, the display is returned to a dark state by an alignment restraining force. An applied voltage is changed to control inclination of the liquid crystal molecules, so as to change an intensity of light transmission from the first polarizer 30. As a result, display of gradation can be realized.

Figure 3A:
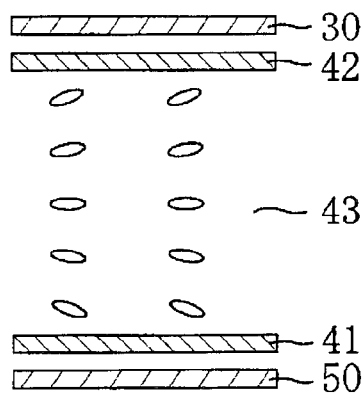
FIGS. 3A to 3D are schematic cross-sectional views illustrating an alignment state of liquid crystal molecules in a liquid crystal layer in the case where the liquid crystal display apparatus of the present invention adopts a liquid crystal cell of an OCB mode.
Figure 3B:
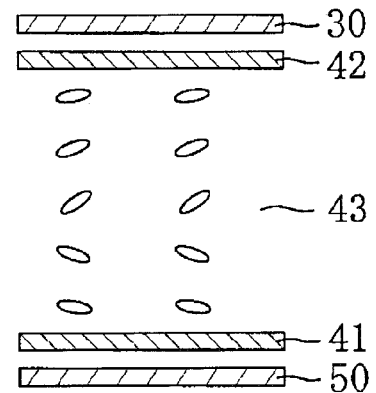
Figure 3C:
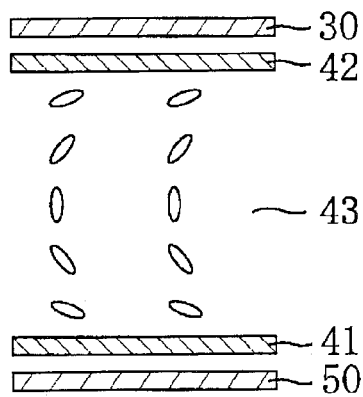
Figure 3D:
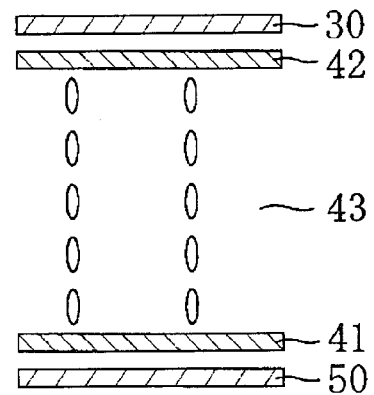

FIGS. 3A to 3D are each a schematic sectional view illustrating an alignment state of liquid crystal molecules in an OCB mode. The OCB mode is a display mode in which the liquid crystal layer 43 is constituted by so-called bend alignment. As shown in FIG. 3C, the bend alignment refers to an alignment state wherein: nematic liquid crystal molecules are aligned at a substantially parallel angle (alignment angle) in the vicinity of a substrate; the alignment angle of the liquid crystal molecules becomes vertical to a substrate plane toward the center of the liquid crystal layer; and the alignment angle changes successively and continuously to parallel with an opposite substrate surface away from the center of the liquid crystal layer. Further, the bend alignment refers to an alignment state having no twist structure across the entire liquid crystal layer. Such bend alignment is formed as follows. As shown in FIG. 3A, the liquid crystal molecules have a substantially homogeneous alignment in a state without application of an electric field or the like (initial state). However, the liquid crystal molecules each have a pretilt angle, and a pretilt angle in the vicinity of the substrate is different from a pretilt angle in the vicinity of the opposite substrate. A predetermined bias voltage (generally 1.5 V to 1.9 V) is applied (low voltage application) to the liquid crystal molecules, to thereby realize spray alignment as shown in FIG. 3B and then into bend alignment as shown in FIG. 3C. Then, a display voltage (generally 5 V to 7 V) is applied (high voltage application) to the state of bend alignment, and thus the liquid crystal molecules align/stand substantially vertical to the substrate surface as shown in FIG. 3D. In a normally white display mode, light entering the liquid crystal layer in a state shown in FIG. 3D during high voltage application through the second polarizer 50 advances without changing a polarization direction and is absorbed by the first polarizer 30, to thereby display a dark state. Upon reduction of a display voltage, the alignment is returned to bend alignment to display a bright state by an alignment restraining force of rubbing treatment. A display voltage is changed to control inclination of the liquid crystal molecules, so as to change an intensity of light transmission from the polarizer. As a result, display of gradation can be realized. The liquid crystal display apparatus provided with an OCB mode liquid crystal cell allows switching of phase transition from a spray alignment state to a bend alignment state at a very high speed, and has excellent dynamic image display characteristics compared to those of a liquid crystal display apparatus provided with a liquid crystal cell of another drive mode such as a TN mode or an IPS mode.

As the display mode of the liquid crystal cell in an OCB mode, either one of a normally white mode that takes a dark state (black display) under the application of high voltage and a normally black mode that takes a bright state (white display) under the application of high voltage can be used.

As the nematic liquid crystal used in the liquid crystal cell in an OCB mode, the nematic liquid crystal having positive dielectric anisotropy is preferably used. Specific examples of the nematic liquid crystal having positive dielectric anisotropy include those described in JP 09-176645A. Commercially available nematic liquid crystal may be used as it is. Examples of the commercially available nematic liquid crystal include "ZLI-4535" (trade name), "ZLI-1132" (tradename), etc. manufactured by Merck Ltd. The difference between the ordinary light refractive index (no) and the extraordinary light refractive index (ne) of the nematic liquid crystal, i.e., the birefringent index ($\Delta n_{LC}$) is appropriately selected depending upon the response rate, transmittance, and the like of the liquid crystal, and is preferably 0.05 to 0.30, more preferably 0.10 to 0.30, and still more preferably 0.12 to 0.30. Further, the pretilt angle of such a nematic liquid crystal is preferably 1° to 10°, more preferably 2° to 8°, and particularly preferably 3° to 6°. If the pretilt angle is in the above range, a response time can be shortened, whereby satisfactory display characteristics can be obtained.

B. Polarizer

Any suitable polarizers may be employed as the first polarizer and the second polarizer depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 5 to 80 µm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

C. Protective Layer

The protective layer is formed of any appropriate film which can be used as a protective film for a polarizing plate. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof includes a thermosetting resin or a UV-curing resin such as a (meth) acrylic resin, an urethane-based resin, a (meth) acrylic urethane-based resin, an epoxy-based resin, or a silicone-based resin. Still another example thereof includes a glassy polymer such as a siloxane-based polymer. Further, a polymer film described in JP 2001-343529 A (WO 01/37007) may also be used. To be specific, the film can be formed of a resin composition containing a thermoplastic resin having a substituted or unsubstituted imide group on a side chain and a thermoplastic resin having a substituted or unsubstituted phenyl group and a nitrile group on a side chain. A specific example thereof includes a resin composition containing an alternate copolymer of isobutene and N-methylmaleimide and an acrylonitrile-styrene copolymer. The polymer film may be an extruded product of the resin composition, for example. Each protective layer may be the same or different.

Glass transition temperature (Tg) of the (meth) acrylic resin is preferably 115° C. or higher, more preferably 120° C. or higher, still more preferably 125° C. or higher, and particularly preferably 130° C. or higher. This is because the (meth) acrylic resin having a glass transition temperature (Tg) of 115° C. or higher can be excellent in durability. The upper limit value of Tg of the (meth)acrylic resin is not particularly limited, but is preferably 170° C. or lower from the viewpoint of formability and the like.

As the (meth)acrylic resin, any appropriate (meth)acrylic resin can be adopted as long as the effects of the present invention are not impaired. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (MS resin, etc.), and a polymer having an alicyclic hydrocarbon group (e.g., a methyl metharylate-cyclohexyl methacrylate copolymer, a methyl methacrylate-norbornyl (meth)acrylate copolymer). A preferred example includes $C_{1-6}$ alkyl poly (meth) acrylic acid such as polymethyl (meth)acrylate. A more preferred example includes a methyl methacrylate-based resin containing methyl methacrylate as a main component (50 to 100% by weight, preferably 70 to 100% by weight).

Specific examples of the (meth) acrylic resin include ACRYPET VH and ACRYPET VRL20A manufactured by Mitsubishi Rayon Co., Ltd., a (meth) acrylic resin having a ring structure in molecules described in JP 2004-70296 A, and a (meth) acrylic resin with high Tg obtained by intramolecular cross-linking or intramolecular cyclization reaction.

As the above (meth) acrylic resin, a (meth) acrylic resin having a lactone ring structure is particularly preferred because of high heat resistance, high transparency, and high mechanical strength.

Examples of the (meth) acrylic resin having the lactone ring structure include (meth)acrylic resins having a lactone ring structure described in JP 2000-230016 A, JP 2001-151814 A, JP 2002-120326 A, JP 2002-254544 A, and JP 2005-146084 A.

The mass average molecular weight (which may also be referred to as weight average molecular weight) of the (meth) acrylic resin having a lactone ring structure is preferably 1,000 to 2,000,000, more preferably 5,000 to 1,000,000, much more preferably 10,000 to 500,000, and particularly preferably 50,000 to 500,000.

The glass transition temperature (Tg) of the (meth)acrylic resin having the lactone ring structure is preferably 115° C. or higher, more preferably 125° C. or higher, still more preferably 130° C. or higher, particularly preferably 135° C. or higher, and most preferably 140° C. or higher. This is because the (meth)acrylic resin having a lactone ring structure and having Tg of 115° C. or higher can be excellent in durability. The upper limit value of the Tg of the (meth)acrylic resin having a lactone ring structure is not particularly limited, but is preferably 170° C. or lower from the viewpoint of formability and the like.

In this specification, the term "(meth)acrylic" refers to acrylic and/or methacrylic.

The above protective layer is preferably transparent and colorless. The thickness direction retardation Rth of the protective layer is preferably −90 nm to +90 nm, more preferably −80 nm to +80 nm, and much more preferably −70 nm to +70 nm.

As the thickness of the above protective layer, any suitable thickness can be adopted as long as the above preferred thickness direction retardation Rth can be obtained. The thickness of the protective layer is typically 5 mm or less, preferably 1 mm or less, more preferably 1 to 500 μm, and much more preferably 5 to 150 μm.

The side of the protective layer (that is placed on outside of the polarizer) opposite to the polarizer (i.e. the most outside of the liquid crystal panel) can be subjected to hard coat treatment, antireflection treatment, sticking prevention treatment, antiglare treatment, or the like, if required.

Preferably, the thickness direction retardation Rth of the protective layers (hereinafter, such protective layer may also be referred to as an inside protective layer) placed between the first polarizer and the first optical compensation layer, and between the second polarizer and the second optical compensation layer are smaller than preferred value as described above. As described above, in the case of a cellulose-based film generally used as a protective film of a polarizer, e.g., a triacetylcellulose film, the thickness direction retardation Rth is about 60 nm at a thickness of 80 μm. A cellulose-based film with large Rth can be subjected to appropriate treatment for decreasing Rth to obtain a smaller thickness direction retardation Rth, thereby obtaining a preferred inside protective layer.

As treatment for decreasing the above thickness direction retardation Rth, any suitable treatment method can be adopted. Examples thereof include a method of attaching a base made of polyethylene terephthalate, polypropylene, or stainless steel with a solvent such as cyclopentanone or methylethylketone applied thereto to a general cellulose-based film, drying the laminate by heating (for example, for about 3 to 10 minutes at about 80 to 150° C.), and thereafter peeling the base; and a method of applying a solution in which a norbornene-based resin, an acrylic resin, or the like is dissolved in a solvent such as cyclopentanone or methylethylketone to a general cellulose-based film, dying the laminate by heating (for example, for about 3 to 10 minutes at 80 to 150° C.), and thereafter peeling the applied film.

Examples of materials forming the above cellulose-based film preferably include aliphatic acid-substituted cellulose-based polymers such as diacetylcellulose and triacetylcellulose. Although the acetic acid substitution degree in generally used triacetylcellulose is about 2.8, the thickness direction retardation Rth can be controlled to be small preferably by controlling the acetic acid substitution degree to 1.8 to 2.7, and more preferably by controlling the propionic acid substitution degree to 0.1 to 1.

By adding a plasticizer such as dibutylphthalate, p-toluenesulfonanilide, or acetyltriethyl citrate to the above aliphatic acid-substituted cellulose-based polymer, the thickness direction retardation Rth can be controlled to be small. The adding amount of the plasticizer is preferably 40 parts by weight or less, more preferably 1 to 20 parts by weight, and much more preferably 1 to 15 parts by weight with respect to 100 parts by weight of the aliphatic acid-substituted cellulose-based polymer.

The treatment methods of decreasing the above thickness direction retardation Rth may be used in an appropriate combination. The thickness direction retardation Rth (550) of the inside protective layer obtained by the treatment is preferably −20 nm to +20 nm, more preferably −10 nm to +10 nm, much more preferably −6 nm to +6 nm, and particularly preferably −3 nm to +3 nm. The in-plane retardation Re(550) of the inside protective layer is preferably 0 nm or more and 10 nm or less, more preferably 0 nm or more and 6 nm or less, and much more preferably 0 nm or more and 3 nm or less.

As the thickness of the inside protective layer, any suitable thickness can be adopted as long as the above preferred thickness direction retardation Rth can be obtained. The thickness of the above inside protective layer is preferably 20 to 200 μm, more preferably 30 to 100 μm, and much more preferably 35 to 95 μm.

D. First Optical Compensation Layer

The first optical compensation layer has an absolute value of a photoelastic coefficient of $40 \times 10^{-12}$ (m$^2$/N) or less, preferably $0.2 \times 10^{-12}$ to $35 \times 10^{-12}$ (m$^2$/N), and more preferably $0.2 \times 10^{-12}$ to $30 \times 10^{-12}$ (m$^2$/N). When the absolute value of the photoelastic coefficient is in the above range, display unevenness and brightness unevenness can be suppressed effectively.

The first optical compensation layer has an in-plane retardation Δnd of 90 nm to 200 nm, preferably 90 to 160 nm, more preferably 95 to 150 nm, and still more preferably 95 to 145 nm.

The first optical compensation layer has a relationship of the following Expression (1).

$$\Delta nd(380) = \Delta nd(550) = \Delta nd(780) \qquad (1)$$

Herein, for example, Δnd(380)=Δnd(550) includes not only the case where Δnd(380) is exactly equal to Δnd(550), but also the case where they are substantially equal to each other. In the specification of the present invention, "substantially equal" includes the case where, for example, Δnd(380) and Δnd(550) are different in a range not having a practical influence on display properties of the liquid crystal panel of the present invention. More specifically, the difference between the maximum value and the minimum value of Δnd in the wavelength of 380 nm to780 nm of the first optical compensation layer is preferably 10 nm or less, more preferably 8 nm or less, and particularly preferably 6 nm or less. Thus, when the first optical compensation layer has so-called flat wavelength dispersion properties, the first optical compensation layer is combined with a second optical compensation layer with a so-called positive dispersion in which a thickness direction retardation decreases with an increase in a wavelength, whereby a liquid crystal panel with a neutral display having no color shift in all azimuth angle directions can be obtained.

Further, the first optical compensation layer has a relationship of the following Expression (2).

$$nx > ny \geq nz \qquad (2)$$

More specifically, the first optical compensation layer has a refractive index profile of nx>ny=nz in one embodiment, and has a refractive index profile of nx>ny>nz in another embodiment. In the embodiment in which the refractive index profile is nx>ny=nz, "ny=nz" includes not only the case where ny and nz are exactly equal to each other, but also the case where they are substantially equal to each other. More specifically, an Nz coefficient of the first optical compensation layer in this embodiment is more than 0.9 to less than 1.1. In the embodiment in which the refractive index profile is nx>ny>nz, an Nz coefficient of the first optical compensation layer is preferably 1.1 to 3.0, more preferably 1.1 to 2.0, particularly preferably 1.1 to 1.7, especially preferably 1.1 to 1.5, and most preferably 1.1 to 1.4. The first optical compensation layer having the above refractive index profile (Nz coefficient) is combined with a particular second optical compensation layer described later for use in a liquid crystal panel, whereby a liquid crystal panel which provides a neutral display having no color shift in all azimuth angle direction can be provided.

The thickness of the first optical compensation layer can be set so as to obtain a desired in-plane retardation. Specifically, the thickness of the first optical compensation layer is preferably 20 to 110 μm, more preferably 25 to 105 μm, and most preferably 30 to 100 μm.

As a material capable of forming the first optical compensation layer, any suitable material can be adopted as long as the above properties are obtained. A typical example of such a material includes a thermoplastic resin. A typical example of the thermoplastic resin includes a cyclic olefin-based resin. More specifically, the first optical compensation layer is preferably a cyclic olefin-based film.

The cyclic olefin-based resin is a general term for a resin prepared through polymerization of a cyclic olefin as a monomer, and examples thereof include resins described in JP 1-240517 A, JP3-14882A, JP3-122137A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6,7,8,8a-octahydronaphtalene, 6-ethyl-1,4:5,8-dimethano-1,4,4a,5,6,7,8,8a-octahydronaphtalene, 6-ethylidene-1,4:5,8-dimethano-1,4,4a,5,6,7,8,8a-octahydronaphtalene, 6-chloro-1,4:5,8-dimethano-1,4,4a,5,6,7,8,8a-octahydronaphtalene, 6-cyano-1,4:5,8-dimethano-1,4,4a,5,6,7,8,8a-octahydronaphtalene, 6-pyridyl-1,4:5,8-dimethano-1,4,4a,5,6,7,8,8a-octahydronaphtalene, and 6-methoxycarbonyl-1,4:5,8-dimethano-1,4,4a,5,6,7,8,8a-octahydronaphtalene; and a trimer of cyclopentadiene and a tetramer of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin, various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

The first optical compensation layer is preferably obtained by stretching a film formed of the cyclic olefin-based resin. Any appropriate forming method may be employed as a method of forming a film from the cyclic olefin-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin are commercially available, and the commercially available films may be subjected to the stretching treatment.

As the stretching method, any suitable method can be adopted in accordance with desired optical properties (for example, refractive index profile, Nz coefficient). Specific examples of the stretching method include transverse uniaxial stretching, free-end uniaxial stretching, fixed-end biaxial stretching, fixed-end uniaxial stretching, and sequential biaxial stretching. A specific example of the fixed-end biaxial stretching includes a method of stretching a film in a short direction (transverse direction) while allowing the film to travel in a lengthwise direction. This method may be apparently transverse uniaxial stretching. These stretching methods can be used alone or in combination. For example, there is a method of performing fixed-end uniaxial stretching after performing free-end uniaxial stretching. The fixed-end uniaxial stretching is preferred. A film having a refractive index profile of nx>ny>nz at an Nz coefficient of about 1.1 to 1.6 is likely to be obtained. Further, a slow axis can be provided in the short direction (widthwise direction) of a film by performing fixed-end uniaxial stretching. Therefore, in the case where a slow axis of the film is placed so as to be perpendicular to an absorption axis of a polarizer, the film and the polarizer can be attached continuously by roll-to-roll, which enhances a production efficiency.

For example, in the case where a film having a refractive index profile of nx>ny>nz is desired, a stretching temperature is preferably 130 to 165° C., more preferably 135 to 165° C., and most preferably 137 to 165° C. By stretching at such a temperature, a first optical compensation layer capable of suitably exhibiting the effects of the present invention can be obtained. In the case where a stretching temperature is lower than 130° C., uniform stretching may not be performed. In the case where a stretching temperature is higher than 165° C., an in-plane retardation desired for the first optical compensation layer may not be expressed. The stretching ratio is preferably 1.2 to 4.0 times, more preferably 1.2 to 3.8 times, and most preferably 1.25 to 3.6 times. By stretching at such a ratio, a first optical compensation layer capable of suitably exhibiting the effects of the present invention can be obtained. In the case where the stretching ratio is smaller than 1.2 times, an in-plane retardation desired for the first optical compensation layer may not be expressed. In the case where a stretching ratio is larger than 4.0 times, a film may be cut or may become brittle during stretching.

For example, in the case where a film having a refractive index profile of nx>ny=nz is desired, a stretching temperature is preferably 110 to 170° C., and more preferably 130 to 150° C. A stretching ratio is preferably 1.3 to 1.7 times, and more preferably 1.4 to 1.6 times.

The first optical compensation layer may be a single layer of a film formed of, for example, a cyclic olefin-based resin as described above, or may be a laminate of a plurality of films having predetermined optical properties. For example, a first optical compensation layer having flat wavelength dispersion properties may be formed by laminating an optical film having a relationship of $\Delta nd(380)>\Delta nd(550)>\Delta nd(780)$ (so-called positive wavelength dispersion properties) and an optical film having a relationship of $\Delta nd(380)<\Delta nd(550)<\Delta nd(780)$ (so-called reverse wavelength dispersion properties). In this case, other optical properties (an in-plane retardation, a thickness direction retardation, an Nz coefficient, a photoelastic coefficient, etc.) can be controlled to the above desired values by adjusting the material, thickness, production conditions, and the like of optical films to be used.

E. Attachment of a First Optical Compensation Layer with an Adjacent Polarizer

As described above, the first optical compensation layer can function as a protective layer on a liquid crystal cell side of one polarizer (in the illustrated example, a first polarizer). In this case, the first optical compensation layer and the first polarizer are attached to each other, preferably, via a pressure-sensitive adhesive or adhesive. It is preferred that a surface of the first optical compensation layer to be attached to the first polarizer is subjected to an adhesion enhancement treatment. As the adhesion enhancement treatment, it is preferred that a resin material is applied. As the resin material, for example, a silicon-based resin, a urethane-based resin, and an acrylic resin are preferably used. Due to the adhesion enhancement treatment, an adhesion enhancement layer is formed. The thickness of the adhesion enhancement layer is preferably 5 to 100 nm and more preferably 10 to 80 nm.

The pressure-sensitive adhesive forms a pressure-sensitive adhesive layer, and the adhesive forms an adhesive layer. The pressure-sensitive adhesive or the adhesive may be applied to the first polarizer, to the first optical compensation layer, or to both the first polarizer and the first optical compensation layer.

The thickness of the pressure-sensitive adhesive layer may appropriately be set in accordance with the intended use or adhesive strength. To be specific, the pressure-sensitive adhesive layer has a thickness of preferably 1 μm to 100 μm, more preferably 3 μm to 50 μm, still more preferably 5 μm to 30 μm, and particularly preferably 10 μm to 25 μm.

Any appropriate pressure-sensitive adhesive may be adopted as the pressure-sensitive adhesive forming the pressure-sensitive adhesive layer. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used for exhibiting appropriate pressure-sensitive adhesive properties (wetness, cohesiveness, and adhesion) with respect to the first polarizer and the first optical compensation layer and providing excellent optical transparency, weatherability, and heat resistance.

The adhesive layer is formed by applying an application liquid containing an adhesive in a predetermined amount to a surface of the first optical compensation layer and/or a surface of the first polarizer and drying the applied liquid, for example. Any appropriate method may be adopted as a method of preparing the application liquid. For example, a commercially available solution or dispersion may be used, or a solvent may be added to the commercially available solution or dispersion and used. Alternatively, a solid content may be dissolved or dispersed in various solvents and then used.

Any adhesive having appropriate properties, form, and adhesion mechanism may be used as the adhesive depending on the purpose. Specific examples thereof include a water-soluble adhesive, a solvent-type adhesive, an emulsion-type adhesive, a latex type adhesive, a mastic adhesive, a multi-layer adhesive, a paste adhesive, a foamed adhesive, and a supported-film adhesive; a thermoplastic adhesive, a heat-melting adhesive, a thermocoagulation adhesive, a hot-melt adhesive, a heat-activated adhesive, an adhesive for heat-sealing, a thermosetting adhesive, a contact adhesive, a pressure-sensitive adhesive, a polymerized adhesive, a solvent-type adhesive, and a solvent-activated adhesive. Of those, in the present invention, a water-soluble adhesive which has excellent transparency, adhesion, workability, and quality of a product, and is excellent in economical efficiency is preferably used.

The water-soluble adhesive contains a water-soluble natural polymer and/or synthetic polymer as the main component (s). Specific examples of the natural polymer include proteins and starch. Specific examples of the synthetic polymer include a resole resin, a urea resin, a melamine resin, polyvinyl alcohol, polyethylene oxide, polyacrylamide, polyvinyl pyrrolidone, an acrylate, a methacrylate, and a polyvinyl alcohol-based resin.

Of the water-soluble adhesives, an adhesive containing as a main component a polyvinyl alcohol-based resin is preferably used in the present invention, and an adhesive containing as a main component modified polyvinyl alcohol having an acetoacetyl group (polyvinyl alcohol-based resin having an acetoacetyl group) is more preferably used because of extremely excellent adhesion to the polarizer and excellent adhesion to the first optical compensation layer. Specific examples of the polyvinyl alcohol-based resin having an acetoacetyl group include: "GOHSENOL Z series" (trade name), manufactured by Nippon Synthetic Chemical Industry Co., Ltd.; "GOHSENOL NH series" (trade name), manufactured by Nippon Synthetic Chemical Industry Co., Ltd.; and "GOHSEFIMER Z series" (trade name), manufactured by Nippon Synthetic Chemical Industry Co., Ltd.

Examples of the polyvinyl alcohol-based resin include: a saponified product obtained by saponifying polyvinyl acetate and derivatives thereof and a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft, phosphate, or the like. Examples of the monomer include: unsaturated carboxylic acids such as maleic anhydrides or maleic acid, fumaric acid, crotonic acid, itaconic acid, and (meth)acrylic acid and esters thereof; α-orefin such as ethylene and propylene; (sodium) (meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. The resins may be used alone or in combination.

The polyvinyl alcohol-based resin has an average polymerization degree of preferably about 100 to 5,000, and more preferably 1,000 to 4,000, and an average saponification degree of preferably about 85 to 100 mol %, and more preferably 90 to 100 mol % from a viewpoint of adhesion.

The polyvinyl alcohol-based resin having an acetoacetyl group may be obtained through a reaction of a polyvinyl alcohol-based resin and a diketene by any appropriate method, for example. Specific examples thereof include: a method of adding a diketene to a dispersion containing a polyvinyl alcohol-based resin dispersed in a solvent such as acetic acid; a method of adding a diketene to a solution containing a polyvinyl alcohol-based resin dissolved in a solvent such as dimethyl formamide or dioxane; and a method of subjecting a diketene gas or a liquid diketene to direct contact with a polyvinyl alcohol-based resin.

A degree of acetoacetyl modification of the polyvinyl alcohol-based resin having an acetoacetyl group is typically 0.1 mol % or more, preferably about 0.1 to 40 mol %, more preferably 1 to 20 mol %, and particularly preferably 2 to 7 mol %. There is a risk that a degree of acetoacetyl modification of less than 0.1 mol % provides insufficient water resistance. A degree of acetoacetyl modification of more than 40 mol % provides a small effect of improving the water resistance. It should be noted that the degree of acetoacetyl modification is a value measured by NMR.

The water-soluble adhesive containing as a main component a polyvinyl alcohol-based resin may preferably further contain a cross-linking agent to further improve water resistance. The cross-linking agent may adopt any appropriate cross-linking agent. A compound having at least two functional groups each having reactivity with the polyvinyl alcohol-based resin can be used as the cross-linking agent. Examples of the compound include: alkylene diamines having an alkylene group and two amino groups such as ethylene diamine, triethylene diamine, and hexamethylene dimamine; isocyanates such as tolylene diisocyanate, hydrogenated tolylene diisocyanate, a trimethylol propane tolylene diisocyanate adduct, triphenylmethane triisocyanate, methylene bis(4-phenylmethane)triisocyanate, isophorone diisocyanate, and ketoxime blocked compounds and phenol blocked compounds thereof; epoxies such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino/formaldehyde resin such as a condensate of formaldehyde with methylolurea, methylol melamine, alkylated methylolurea, alkylated methylol melamine, acetoguanamine, or benzoguanamine; and salts of divalent metals or trivalent metals such as sodium, potassium, magnesium, calcium, aluminum, iron, and nickel and oxides thereof. Of those, an amino/formaldehyde resin and dialdehydes are preferred. A compound having a methylol group is preferred as an amino/formaldehyde resin, and glyoxal is preferred as dialdehydes. Of those, a compound having a methylol group is preferred, and methylol melamine is particularly preferred. Specific examples of the aldehyde compound include: "Glyoxal" (trade name), manufactured by Nippon Synthetic Chemical Industry Co., Ltd.; and "Sequarez 755" (trade name), manufactured by OMNOVA Solutions Inc. A specific example of the amine compound is "m-Xylenediamine" (trade name), manufactured by Mitsubishi Gas Chemical Company, Inc. A specific example of the methylol compound is "WATERSOL series" (trade name), manufactured by Dainippon Ink and Chemicals, Incorporated.

A mixing amount of the cross-linking agent is preferably 1 to 60 parts by weight with respect to 100 parts by weight of polyvinyl alcohol (preferably a polyvinyl alcohol-based resin having an acetoacetyl group). An upper limit of the mixing amount is more preferably 50 parts by weight, still more preferably 30 parts by weight, and still more preferably 15 parts by weight, particularly preferably 10 parts by weight, and most preferably 7 parts by weight. A lower limit of the mixing amount is more preferably 5 parts by weight, still more preferably 10 parts by weight, and particularly preferably 20 parts by weight. The mixing amount is adjusted within the above ranges, to thereby form an adhesive layer having excellent transparency, adhesion, and water resistance. Note that in the case where the mixing amount of the cross-linking agent is large, a reaction of the cross-linking agent proceeds in a short period of time and the adhesive tends to undergo gelling. As a result, a pot life of the adhesive is significantly reduced, and industrial use may become difficult. However, in the case where a metal compound colloid is used in combination as described below, the cross-linking agent in a large mixing amount may be used stably.

A water-soluble adhesive containing as a main component the polyvinyl alcohol-based resin may preferably further contain a metal compound colloid. The metal compound colloid may contain metal compound fine particles dispersed in a dispersion medium and may realize electrostatic stabilization based on mutual repulsion of same charges of the fine particles and may have permanent stability. An average particle size of the fine particles forming the metal compound colloid may be any appropriate value as long as not adversely affecting optical properties such as polarization properties. The average particle size thereof is preferably 1 to 100 nm, and more preferably 1 to 50 nm, for uniformly dispersing the fine particles in the adhesive layer, assuring adhesion, and suppressing knicks. Note that the term "knicks" refers to local uneven defects formed at an interface between the polarizer and the protective layer.

The metal compound may adopt any appropriate compound. Examples thereof include: a metal oxide such as alumina, silica, zirconia, or titania; a metal salt such as aluminum silicate, calcium carbonate, magnesium silicate, zinc carbonate, barium carbonate, or calcium phosphate; and a mineral such as celite, talc, clay, or kaolin. Alumina is preferred.

The metal compound colloid is typically dispersed in a dispersion medium and present in a state of a colloidal solution. Examples of the dispersion medium include water and alcohols. A solid content in the colloidal solution is typically about 1 to 50 wt %. The colloidal solution may contain as a stabilizer an acid such as nitric acid, hydrochloric acid, or acetic acid.

The mixing amount of the metal compound colloid (solid content) is 200 parts by weight or less, more preferably 10 to 200 parts by weight, still more preferably 20 to 175 parts by weight, and most preferably 30 to 150 parts by weight with respect to 100 parts by weight of the polyvinyl alcohol-based resin for assuring adhesion and suppressing generation of knicks.

A method of preparing the adhesive may adopt any appropriate method. For example, in the case where the adhesive contains a metal compound colloid, an example of the method includes a method of compounding a metal compound colloid with a mixture of a polyvinyl alcohol-based resin and a cross-linking agent mixed in advance to an appropriate concentration. Alternatively, a polyvinyl alcohol-based resin and a metal compound colloid may be mixed, and then a cross-linking agent may be mixed thereinto in consideration of use timing and the like. Note that a concentration of a resin solution may be adjusted after preparation of the resin solution.

A resin concentration of the adhesive is preferably 0.1 to 15 wt %, and more preferably 0.5 to 10 wt % from the viewpoints of applicability, shelf stability, and the like.

A pH of the adhesive is preferably 2 to 6, more preferably 2.5 to 5, still more preferably 3 to 5, and most preferably 3.5 to 4.5. In general, a surface charge of the metal compound colloid may be controlled by adjusting the pH. The surface charge is preferably a positive charge. The metal compound colloid has a positive charge, and thus formation of knicks may be suppressed, for example.

A total solid content of the adhesive may vary depending on the solubility, application viscosity, wettability, intended thickness, and the like of the adhesive. The total solid content is preferably 2 to 100 (weight ratio), more preferably 10 to 50 (weight ratio), and most preferably 20 to 40 (weight ratio) with respect to 100 of a solvent. The total solid content of the adhesive within the above ranges can provide an adhesive layer having surface with high uniformity.

A viscosity of the adhesive is not particularly limited, but is preferably 1 to 50 (mPa·s), more preferably 2 to 30 (mPa·s), and most preferably 4 to 20 (mPa·s) measured at 23° C. and a shear rate of 1,000 (1/s). A viscosity of the adhesive within the above ranges allows formation of an adhesive layer having excellent surface uniformity.

Any appropriate method may be adopted as a method of applying the adhesive, and an example thereof is an application method using a coater. A coater to be used may be appropriately selected from the above-mentioned coaters.

A glass transition temperature (Tg) of the adhesive is not particularly limited, but is preferably 20 to 120° C., more preferably 40 to 100° C., and most preferably 50 to 90° C. The glass transition temperature can be determined by differential scanning calorimetry (DSC) measurement in accordance with JIS K7121-1987.

A thickness of the adhesive layer is not particularly limited, but is preferably 0.01 to 0.15 µm, more preferably 0.02 to 0.12 µm, and most preferably 0.03 to 0.09 µm. A thickness of the adhesive layer within the above ranges can provide a liquid crystal panel having excellent durability causing no peeling or floating of the polarizer even when the liquid crystal panel of the present invention is exposed to high temperature and high humidity environment.

The adhesive may contain a coupling agent such as a silane coupling agent or a titanium coupling agent, various tackifiers, an UV absorber, an antioxidant, a stabilizer such as a heat resistant stabilizer or a hydrolysis resistant stabilizer.

F. Second Optical Compensation Layer

The second optical compensation layer has a relationship of the following Expressions (3) and (4).

$$Rth(380) > Rth(550) > Rth(780) \quad (3)$$

$$nx = ny > nz \quad (4)$$

The second optical compensation layer may be a single layer or a laminate of a plurality of layers. In the case of the laminate, the material used for forming each layer and the thickness of each layer may appropriately be set as long as the laminate as a whole has optical properties as described above.

As represented by Expression (3), in the second optical compensation layer, a thickness direction retardation has so-called positive wavelength dispersion properties. By using the second optical compensation layer having such wavelength dispersion properties in combination with a first optical compensation layer having so-called flat wavelength dispersion properties, the wavelength dispersion properties of a liquid crystal cell can be compensated satisfactorily, and as a result, a liquid crystal panel which provides a display having no color shift in all azimuth angle directions can be provided. More specifically, the Rth(380)/Rth(550) of the second optical compensation layer is preferably 1.12 to 1.25, and more preferably 1.15 to 1.20. The Rth(550)/Rth(780) of the second optical compensation layer is preferably 1.03 to 1.10, and more preferably 1.04 to 1.07.

As represented by Expression (4), the second optical compensation layer has a relationship of $nx = ny > nz$, and may function as a so-called negative C plate. The second optical compensation layer having such a refractive index profile may be used in combination with the first optical compensation layer, and thus the effects of the present invention may effectively be attained. As described above, in the specification of the present invention, "nx=ny" not only refers to the case where nx and ny are exactly equal to each other but also includes the case where nx and ny are substantially equal to each other. Thus, the second optical compensation layer may have an in-plane retardation and may have a slow axis. An acceptable in-plane retardation Δnd of the second optical compensation layer as a negative C plate for practical use is preferably 0 to 20 nm, more preferably 0 to 10 nm, and still more preferably 0 to 5 nm.

A thickness direction retardation Rth of the second optical compensation layer is preferably 30 to 350 nm, more preferably 60 to 300 nm, still more preferably 80 to 260 nm, and most preferably 100 to 240 nm.

The thickness of the second optical compensation layer having such a thickness direction retardation may vary depending on the materials to be used and the like. For example, the thickness of the second optical compensation layer is preferably 1 to 50 µm, more preferably 1 to 20 µm, still more preferably 1 to 15 µm, still more preferably 1 to 10 µm, particularly preferably 1 to 8 µm, and most preferably 1 to 5 µm. Such a thickness is smaller than a thickness of a negative C plate (60 µm or more, for example) obtained through biaxial stretching and may significantly contribute to reduction in thickness of an liquid crystal display apparatus. Further, the second optical compensation layer may be formed to be extremely thin, to thereby significantly prevent heat unevenness. In the present invention, the first optical compensation layer functions as a protective layer of the polarizer, and has a very small photoelastic coefficient. Therefore, the synergistic effect combined with the effect that the second optical compensation layer is very thin is exhibited, which can remarkably greatly contribute to the reduction in thickness of a liquid crystal display apparatus and the prevention of display unevenness and heat unevenness thereof.

A material used for forming the second optical compensation layer may adopt any appropriate material as long as the optical properties as described above can be obtained. Preferably, the second optical compensation layer is a coated layer of a non-liquid crystal material because the thickness thereof can be remarkably reduced compared with a thickness of a stretched film and may contribute to reduction in thickness of a liquid crystal panel. Preferably, the non-liquid crystal material is a non-liquid crystal polymer. In the case where such a non-liquid crystal material is used for a coated layer, the non-liquid crystal material differs from a liquid crystalline material and may form a film having optical uniaxial property of $nx=ny>nz$ due to its property regardless of alignment property of a substrate. As a result, not only an aligned substrate but also a non-aligned substrate may be used. Further, even in the case where a non-aligned substrate is used, a step of applying an alignment film to its surface, laminating an alignment film thereon, or the like may be omitted.

Examples of the non-liquid crystal material include polymers described in paragraphs (0018) to (0072) of JP 2004-46065 A such as a polyamide, a polyimide, a polyester, a polyether ketone, a polyamideimide, and a polyestermide, because those polymers have excellent heat resistance, chemical resistance, and transparency, and high rigidity. One kind of polymer may be used alone, or the polymers may be used as a mixture of two or more kinds of polymers having different functional groups, such as a mixture of polyarylether ketone and polyamide. Of the polymers, a polyimide is particularly preferred because it has high transparency, high alignment property, and high stretching property. In one embodiment, the polyimide has a structure represented by the following Formula (I). If polyimide with such a structure is used as a non-liquid crystal material, the second optical compensation layer can be rendered particularly thin. In the case where the sum of X and Y in Formula (I) is 100, X is 30 to 70, and Y is 70 to 30.

The molecular weight of the polymer is not particularly limited, and for example, a weight average molecular weight (Mw) is preferably in a range of 1,000 to 1,000,000, and more preferably in a range of 2,000 to 500,000.

Next, description will be given of a method of forming a second optical compensation layer through coating by using a non-liquid crystal polymer as described above. The method of forming a second optical compensation layer may adopt any appropriate method as long as a second optical compensation layer having the optical properties as described above can be obtained. A typical production method includes a step of applying a solution of the non-liquid crystal polymer to a base material film and a step of forming a non-liquid crystal polymer layer by removing a solvent in the solution. The non-liquid crystal polymer layer may be formed through direct application to a polarizer (typically, a protective layer of a polarizer) (that is, the protective layer of the polarizer may also serve as a base material film), or the non-liquid crystal polymer layer may be formed on any appropriate base material and then transferred to a polarizer (typically, a protective layer of a polarizer). A method involving transfer may further include peeling off of the base material.

The base material film may adopt any appropriate film. A typical example of the base material film is a plastic film to be used for the protective layer of the polarizer described above. The protective layer of the polarizer itself may also serve as a base material film.

Examples of the solvent of the application solution include, but not limited to: halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerine, ethylene glycol, triethylene glycol, ethylene glycol monomethylether, diethylene glycol dimethylether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl

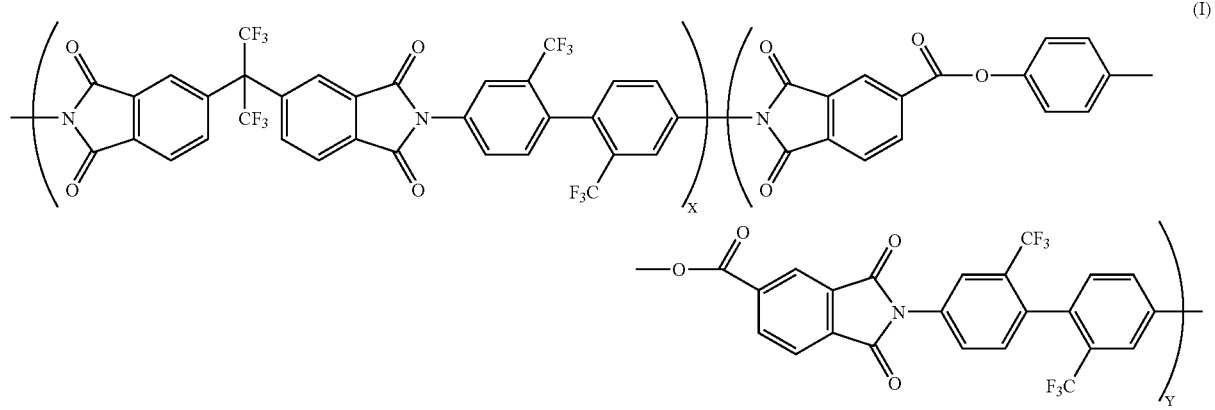

ether, dibutyl ether, and tetrahydrofurane; carbon disulfide; ethyl cellosolve; and butyl cellosolve. Of those, methyl isobutyl ketone is preferred, because non-liquid crystal materials exhibits high solubility in the solvent and the solvent does not corrode the base material film. They may be used alone or in combination.

As the concentration of the non-liquid crystal polymer in the application solution, any appropriate concentration can be adopted as long as the second optical compensation layer is obtained and application can be performed. For example, the solution contains a non-liquid crystal polymer in an amount of preferably 5 to 50 parts by weight, and more preferably 10 to 40 parts by weight with respect to 100 parts by weight of the solvent. The solution in such a concentration range has viscosity that makes application easier.

The application solution can further contain various additives such as a stabilizer, a plasticizer, and metals as required.

The application solution can further contain other different resins as required. Examples of such other resins include various kinds of general-purpose resins, an engineering plastic, a thermoplastic resin, and a thermosetting resin. By using such resins together, a second optical compensation layer having suitable mechanical strength and durability depending on the purpose can be formed. Such resin can be added to the non-liquid crystal polymer in an amount of preferably 0 to 50% by mass, and more preferably 0 to 30% by mass.

Examples of the application methods for the solution include spin coating, roll coating, flow coating, printing, dip coating, casting, bar coating, and gravure printing. Further, in application, a method of superimposing a polymer layer may also be adopted as required. After application, for example, a solvent in the solution is evaporated to be removed by drying such as natural drying, air drying, and heat drying (e.g., at 60 to 250° C.), whereby an optical compensation layer in a film shape is formed.

G. Attachment of a Second Optical Compensation Layer with an Adjacent Polarizer

As described above, the second optical compensation layer in the present invention can be preferably formed as a coated layer on a base material. In the case where the base material also serves as a protective layer of the polarizer (for example, in the case where the base material is formed of a cellulose-based film such as a triacetyl cellulose film), a side opposite to the coated layer of the base material is preferably attached to one polarizer (in the illustrated example, second polarizer) via a pressure-sensitive adhesive or an adhesive. In the case where the base material does not serve as a protective layer of the polarizer, the second optical compensation layer is preferably transferred to the second polarizer (typically, a protective layer of the second polarizer), and then the base material is peeled off. Details of the pressure-sensitive adhesive or the adhesive are as described above.

Hereinafter, the present invention will be specifically described by way of examples. However, the present invention is not limited to the examples. Methods of measuring characteristics in the examples are as described below.

(Measurement of Retardation)

Refractive indices nx, ny, and nz of a sample film were measured with an automatic birefringence analyzer (Automatic birefringence analyzer KOBRA-WPR manufactured by Oji Scientific Instruments), and an in-plane retardation And a thickness direction retardation Rth were calculated. A measurement temperature was 23° C., and a measurement wavelength was 590 nm. The wavelength dispersion properties were measured at 380, 550, and 780 nm.

(Measurement of Contrast)

Figure 4:
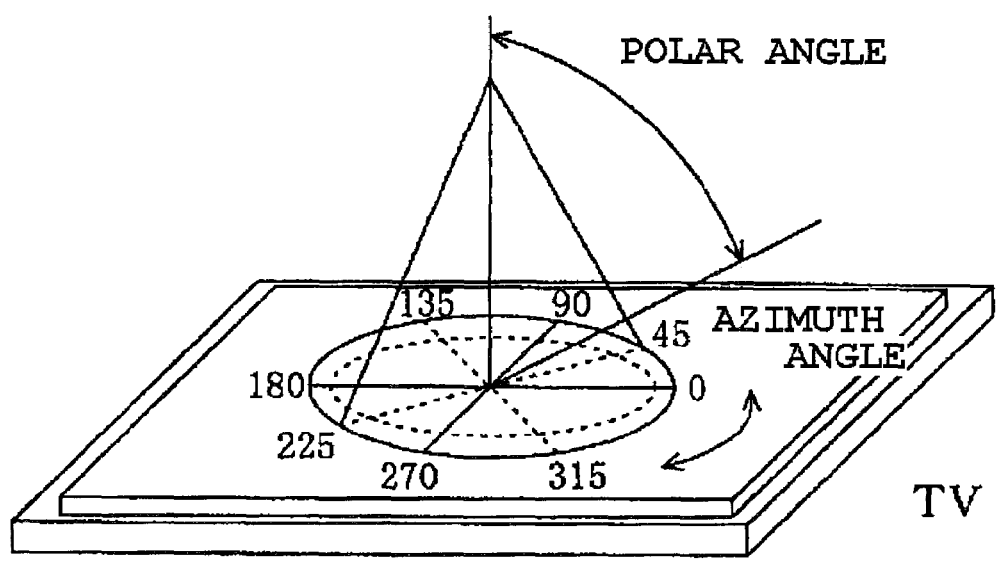
FIG. 4 is a schematic view illustrating an azimuth angle and a polar angle.
Figure 5A:
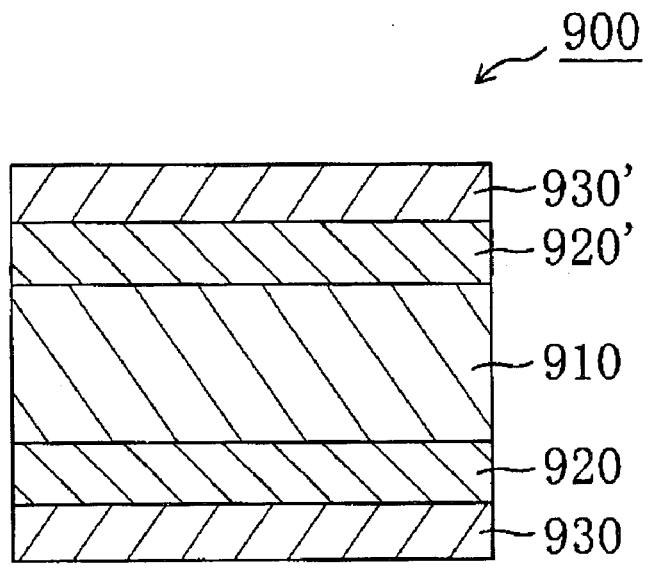
FIG. 5A is a schematic cross-sectional view of a conventional typical liquid crystal display apparatus.
Figure 5B:
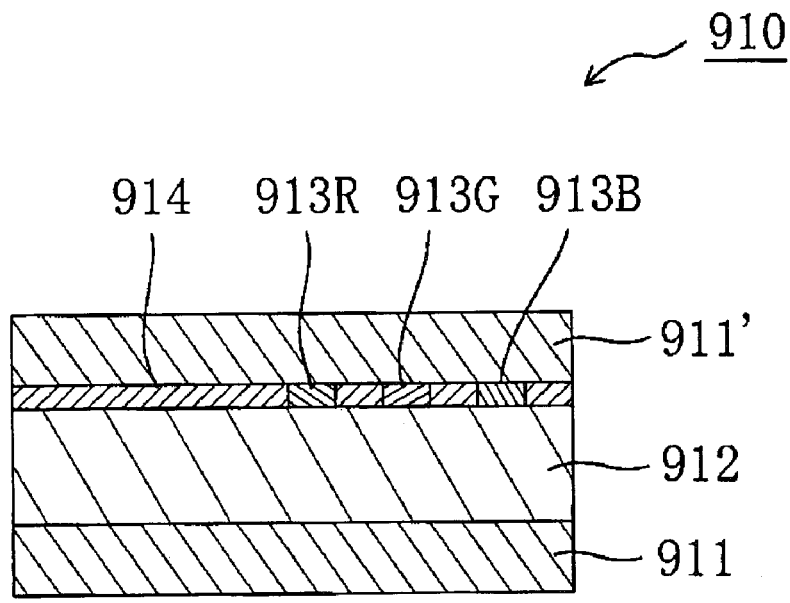
FIG. 5B is a schematic cross-sectional view of a liquid crystal cell used in the liquid crystal display apparatus.

An azimuth angle was varied from 0 to 360° at a polar angle of 60°, and contrasts at azimuth angles of 45°, 135°, 225°, and 315° were measured by using "EZ Contrast 160D" (trade name, manufactured by ELDIM SA). An average value of the contrasts was determined. Note that the azimuth angle and the polar angle are as shown in FIG. 4.

(Measurement of Color Shift)

Tones of a liquid crystal display apparatus at an azimuth angle varying from 0 to 360° and a polar angle of 60° were measured by using "EZ Contrast 160D" (trade name, manufactured by ELDIM SA), and were plotted on an xy chromaticity diagram.

(Measurement of Brightness in a Black Display)

A relationship between the azimuth angle and brightness in a black display was plotted at a polar angle of 60° and an azimuth angle varying from −180 to 180° by using "EZ Contrast 160D" (trade name, manufactured by ELDIM SA).

(Knick Evaluation)

After the elapse of 30 minutes after a backlight was lighted in a dark room at 23° C., a display surface in the case of performing a black display was visually observed, and the presence/absence of knick was determined based on the presence/absence of luminescent points.

A: No knick was observed.

B: Knick was observed, but no practical problems occurred.

C: Knick was observed, and practical problems occurred.

REFERENCE EXAMPLE 1

Production of a Polarizer

May be Referred to as First Polarizer and/or Second Polarizer

A polyvinyl alcohol film was colored in an aqueous solution containing iodine, and the resultant was uniaxially stretched 6 times between rolls with different speed ratios in an aqueous solution containing boric acid, to thereby produce a polarizer.

REFERENCE EXAMPLE 2

Preparation of a Polyvinyl Alcohol-Based Adhesive 50 parts by weight of methylol melamine were dissolved in pure water at a temperature of 30° C. with respect to 100 parts by weight of a polyvinyl alcohol-based resin containing an acetoacetyl group ("GOSEFIMER Z200" (trade name), manufactured by Nippon Synthetic Chemical Industry Co., Ltd., average polymerization degree: 1,200, saponification degree: 98.5 mol %, acetoacetylation degree: 5 mol %), whereby an aqueous solution with a solid content adjusted to 3.7% was obtained. To 100 parts by weight of the aqueous solution, 18 parts by weight of an aqueous alumina colloidal solution (average particle size: 15 nm, solid content: 10%, positive charge) was added, to thereby prepare an adhesive aqueous solution. The viscosity of the adhesive aqueous solution was 9.6 mPa·s. The pH of the adhesive aqueous solution was 4 to 4.5.

REFERENCE EXAMPLE 3

Preparation of a Polyvinyl Alcohol-Based Adhesive 50 parts by weight of methylol melamine were dissolved in pure water at a temperature of 30° C. with respect to 100 parts by weight of a polyvinyl alcohol-based resin containing an acetoacetyl group ("GOSEFIMER Z200" (trade name), manufactured by Nippon Synthetic Chemical Industry Co., Ltd., average polymerization degree: 1,200, saponification degree: 98.5 mol %, acetoacetylation degree: 5 mol %), whereby an adhesive aqueous solution with a solid content adjusted to 3.7% was obtained. The viscosity of the adhesive aqueous solution was 9.6 mPa·s. The pH of the adhesive aqueous solution was 4 to 4.5.

EXAMPLE 1

Production of a Retardation Film Integrated with a Polarizing Plate (1A)

A norbornene-based resin film (ZEONOR ZF14-100 (trade name) manufactured by Nippon Zeon Co., Ltd., thickness: 100 μm) was subjected to fixed-end uniaxial stretching in a TD direction by 2.6 times at 150° C., whereby a first optical compensation layer was produced. The first optical compensation layer had a thickness of 33 μm, and an Nz of 1.41 (Rth=170 nm, Δnd=120 nm). Further, the first optical compensation layer had Δnd(380) of 124 nm, Δnd(550) of 120 nm, and Δnd(780) of 118 nm. The difference between the maximum and minimum values of Δnd in 380 nm to 780 nm was 6 nm. In addition, the photoelastic coefficient of the first optical compensation layer was $6 \times 10^{-12}$ ($m^2/N$).

The first polarizer obtained in Reference Example 1 and the first optical compensation layer were attached to each other so that an absorption axis of the first polarizer was perpendicular to a slow axis of the first optical compensation layer. Further, a triacetyl cellulose (TAC) film (thickness: 80 μm) was attached to a side of the first polarizer opposite against the first optical compensation layer. Each layer was attached via the polyvinyl alcohol-based adhesive (thickness: 0.1 μm) obtained in Reference Example 2. Thus, a retardation film integrated with a polarizing plate (1A) was produced.

(Production of a Retardation Film Integrated with a Polarizing Plate (1B))

A solution (concentration: 10% by weight) in which polyimide synthesized from 2,2'-bis(3,4-dicarboxylphenyl)hexafluoropropane) and 2,2'-bis(trifluoromethyl)-4,4'-diaminobiphenyl was dissolved in methylisobutylketone (MIBK) was applied to a TAC base material (thickness: 80 μm) to a thickness of 30 μm. After that, the resultant TAC base material was dried at 120° C. for 10 minutes, where by a laminated film of the base material/second optical compensation layer was obtained in which the thickness of a polyimide layer (second optical compensation layer) was about 3 μm. The refractive index profile of the obtained second optical compensation layer was nx=ny>nz. Further, the obtained second optical compensation layer had Rth(380) of 213 nm, Rth(550) of 180 nm, and Rth(780) of 170 nm. The second polarizer obtained in Reference Example 1 was attached to the base material side of the laminated film using the polyvinyl alcohol-based adhesive (thickness: 0.1 μm) obtained in Reference Example 2. Further, a triacetylcellulose (TAC) film (thickness: 80 μm) was attached to a side of the second polarizer opposite against the second optical compensation layer using the polyvinyl alcohol-based adhesive (thickness: 0.1 μm) obtained in Reference Example 2. Thus, a retardation film integrated with a polarizing plate (1B) was produced.

(Production of a Liquid Crystal Panel (1C))

A liquid crystal cell (VA mode) was taken out of a liquid crystal panel (BRAVIA manufactured by Sony Corporation, 32-inch panel), and the retardation film integrated with a polarizing plate (1A) and the retardation film integrated with a polarizing plate (1B) were attached above and below the liquid crystal cell to sandwich the liquid crystal cell by using an acrylic pressure-sensitive adhesive (thickness: 20 μm) such that absorption axes of polarizers included in the retardation film integrated with a polarizing plate (1A) and the retardation film integrated with a polarizing plate (1B) were perpendicular to each other. Attachment was conducted such that the retardation film integrated with a polarizing plate (1B) was placed on a backlight side and the retardation film integrated with a polarizing plate (1A) was placed on a viewer side.

(Evaluation)

Figure 6:
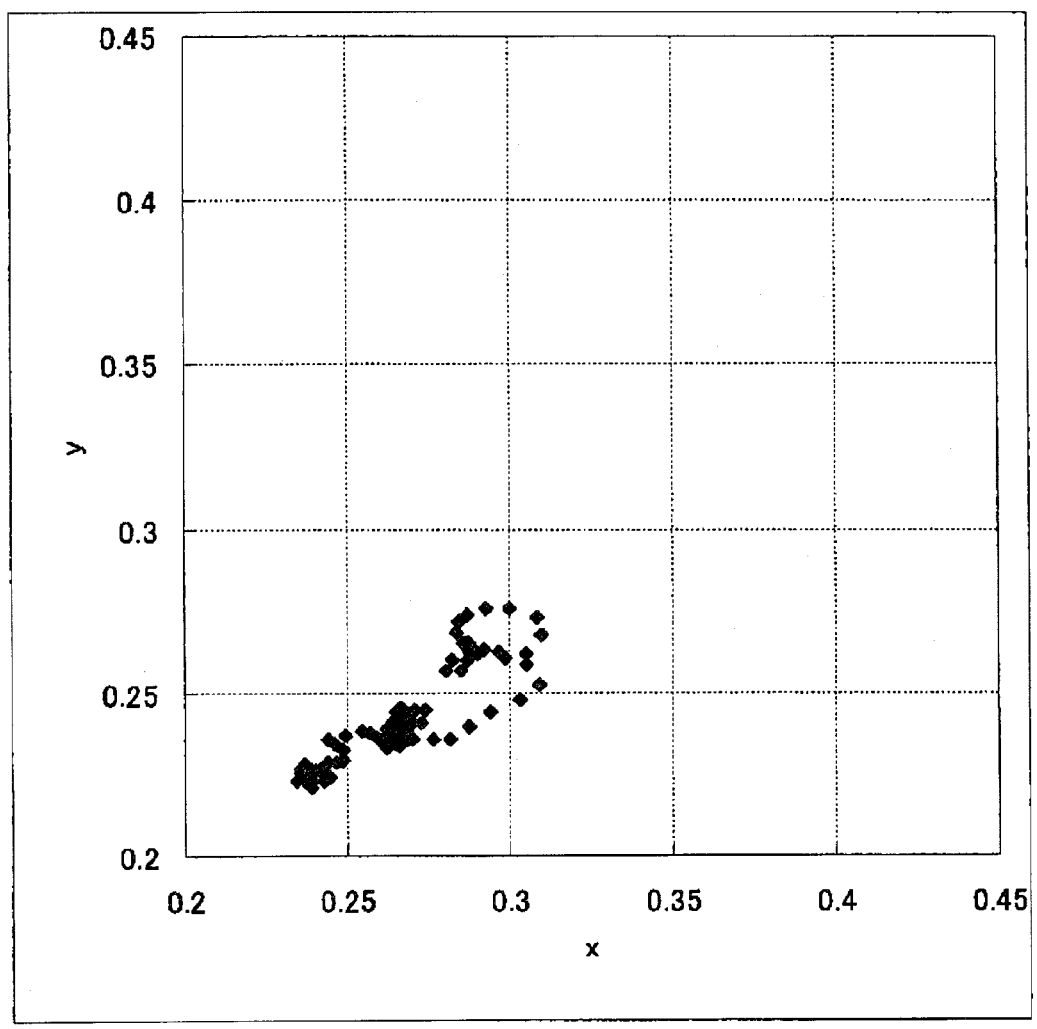
FIG. 6 is an xy chromaticity diagram illustrating a color shift measured in Example 1.
Figure 7:
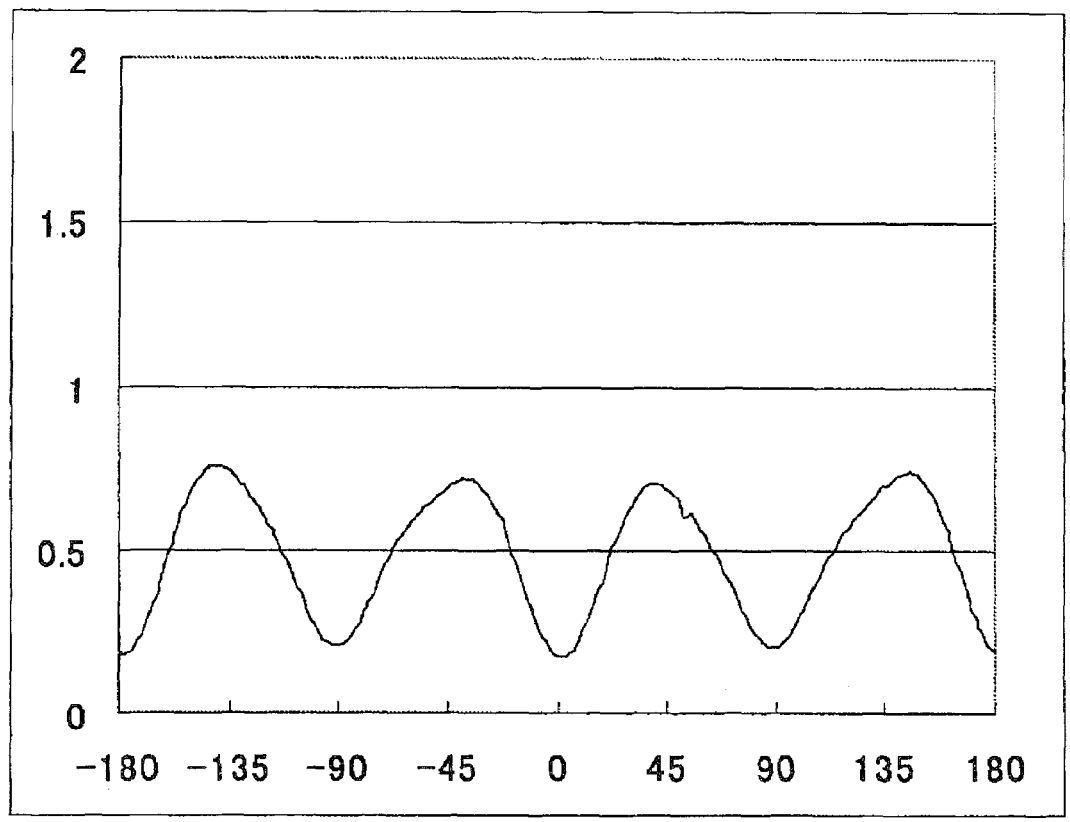
FIG. 7 is a graph illustrating brightness in a black display measured in Example 1.
Figure 16:
FIG. 16 is photographs illustrating brightness unevenness measured in Example 1 and Comparative Example 4.
Figure 16:
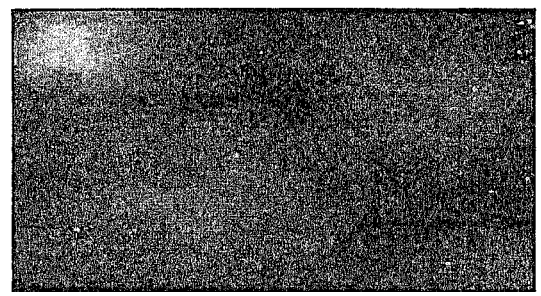

In the obtained liquid crystal panel (1C), a contrast was obtained in accordance with the evaluation method, and knick evaluation was performed. Table 1 shows the results. FIG. 6 shows measurement results of a color shift (xy chromaticity diagram), and FIG. 7 shows measurement results of brightness in a black display. Further, brightness unevenness in the case of displaying an entire screen in a black display using CA1500 manufactured by Konica Minolta Co., Ltd. was measured. FIG. 16 shows the results.

EXAMPLE 2

Production of a Retardation Film Integrated with a Polarizing Plate (2B)

A solution (concentration: 10% by weight) in which polyimide having a structure represented by the following Formula (II) was dissolved in methylisobutylketone (MIBK) was applied to a TAC base (thickness: 80 μm) to a thickness of 25 μm. After that, the resultant TAC base was dried at 120° C. for 10 minutes, whereby a laminated film of a base material/second optical compensation layer was obtained in which the thickness of a polyimide layer (second optical compensation layer) was about 2.5 μm. The refractive index profile of the obtained second optical compensation layer was nx=ny>nz. Further, the second optical compensation layer had Rth(380) of 213 nm, Rth(550) of 180 nm, and Rth(780) of 170 nm. The second polarizer obtained in Reference Example 1 was attached to the base material side of the laminated film using the polyvinyl alcohol-based adhesive (thickness: 0.1 μm) obtained in Reference Example 2. Further, a triacetylcellulose (TAC) film (thickness: 80 μm) was attached to a side of the second polarizer opposite against the second optical compensation layer using the polyvinyl alcohol-based adhesive (thickness: 0.1 μm) obtained in Reference Example 2. Thus, a retardation film integrated with a polarizing plate (2B) was produced.

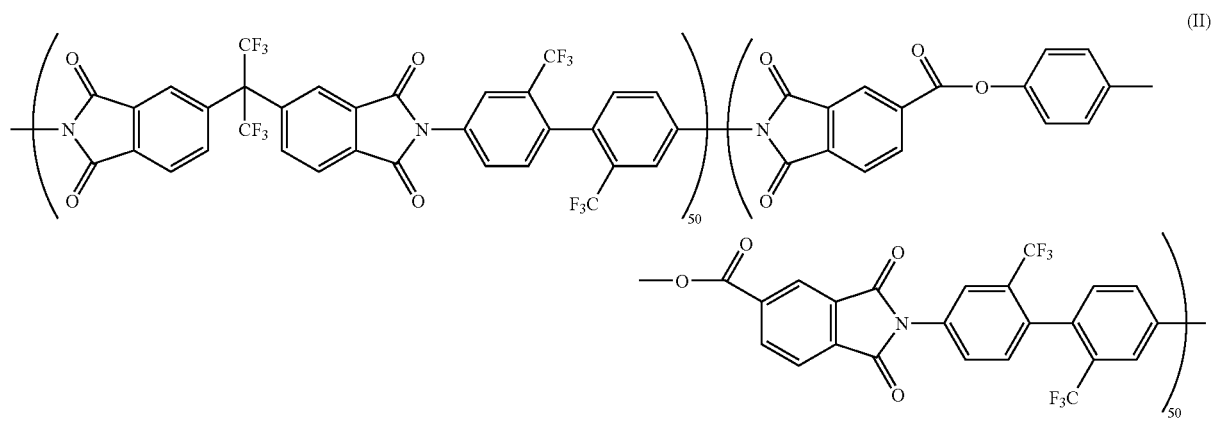

(Production of a Liquid Crystal Panel (2C))

A liquid crystal panel (2C) was produced in the same way as in Example 1, except for using the retardation film integrated with a polarizing plate (2B) in place of the retardation film integrated with a polarizing plate (1B).

(Evaluation)

In the obtained liquid crystal panel (2C), a contrast was obtained in accordance with the evaluation method, and knick evaluation was performed. Table 1 shows the results.

EXAMPLE 3

A liquid crystal panel (3C) was produced in the same way as in Example 1, except for using the polyvinyl alcohol-based adhesive obtained in Reference Example 3 in place of the polyvinyl alcohol-based adhesive obtained in Reference Example 2, as the adhesive for attaching the above first polarizer to the first optical compensation layer.

(Evaluation)

In the obtained liquid crystal panel (3C), a contrast was obtained in accordance with the evaluation method, and knick evaluation was performed. Table 1 shows the results.

COMPARATIVE EXAMPLE 1

Production of a Retardation Film Integrated with a Polarizing Plate (C1A)

A Solution (Concentration: 10% by Weight) in which Polyimide synthesized from 2,2'-bis(3,4-dicarboxyphenyl)hexafluoropropane) and 2,2'-bi(trifluoromethyl)-4,4'-diaminobiphenyl was dissolved in methylisobuylketone (MIBK) was applied to a TAC base material (thickness: 80 μm) to a thickness of 30 μm. After that, the resultant base material was dried at 120° C. for 10 minutes, whereby a laminated film of a base material/optical compensation layer was obtained in which the thickness of a polyimide layer was about 3 μm. The obtained laminated film was transversely stretched 1.2 times at 150° C. The optical compensation layer in the stretched laminated film had a refractive index profile of nx>ny>nz, and an Nz of 4.9. Further, the optical compensation layer had a relationship of Δnd(380)>Δnd(550)>Δnd(780). Further, the photoelastic coefficient of the optical compensation layer was $20 \times 10^{-12}$ (m$^2$/N). The polarizer obtained in Reference Example 1 was attached to the base material side of the laminated film using the polyvinyl alcohol-based adhesive (thickness: 0.1 μm) obtained in Reference Example 2 so that an absorption axis of the polarizer was perpendicular to a slow axis of the optical compensation layer. Further, a triacetylcellulose (TAC) film (thickness: 80 μm) was attached to a side of the polarizer opposite against the optical compensation layer, using the polyvinyl alcohol-based adhesive (thickness: 0.1 μm) obtained in Reference Example 2. Thus, a retardation film integrated with a polarizing plate (C1A) was produced.

(Production of a Liquid Crystal Panel (C1C))

A liquid crystal cell (VA mode) was taken out of a liquid crystal panel (manufactured by Sony Corporation, BRAVIA, 32-inch panel), and the retardation film integrated with a polarizing plate (C1A) and a polarizing plate (trade name: SEG1224) manufactured by Nitto Denko Corporation were attached above and below the liquid crystal cell to sandwich the liquid crystal cell by using an acrylic pressure-sensitive adhesive (thickness: 20 μm) such that absorption axes of polarizers included in the retardation film integrated with a polarizing plate (C1A) and SEG1224 were perpendicular to each other. Attachment was conducted such that the retardation film integrated with a polarizing plate (C1A) was placed on a backlight side and SEG1224 was placed on a viewer side.

(Evaluation)

Figure 8:
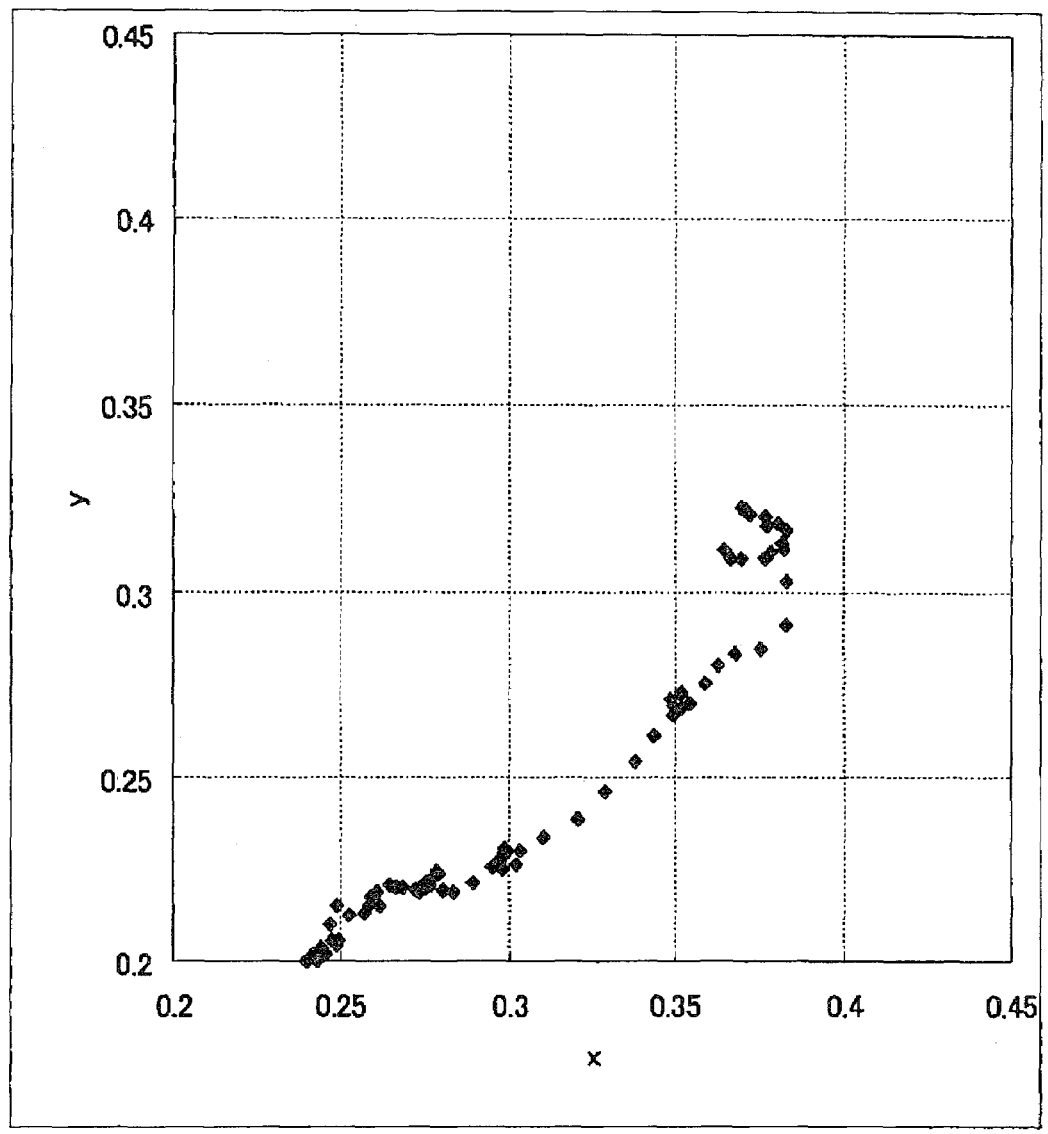
FIG. 8 is an xy chromaticity diagram illustrating a color shift measured in Comparative Example 1.
Figure 9:
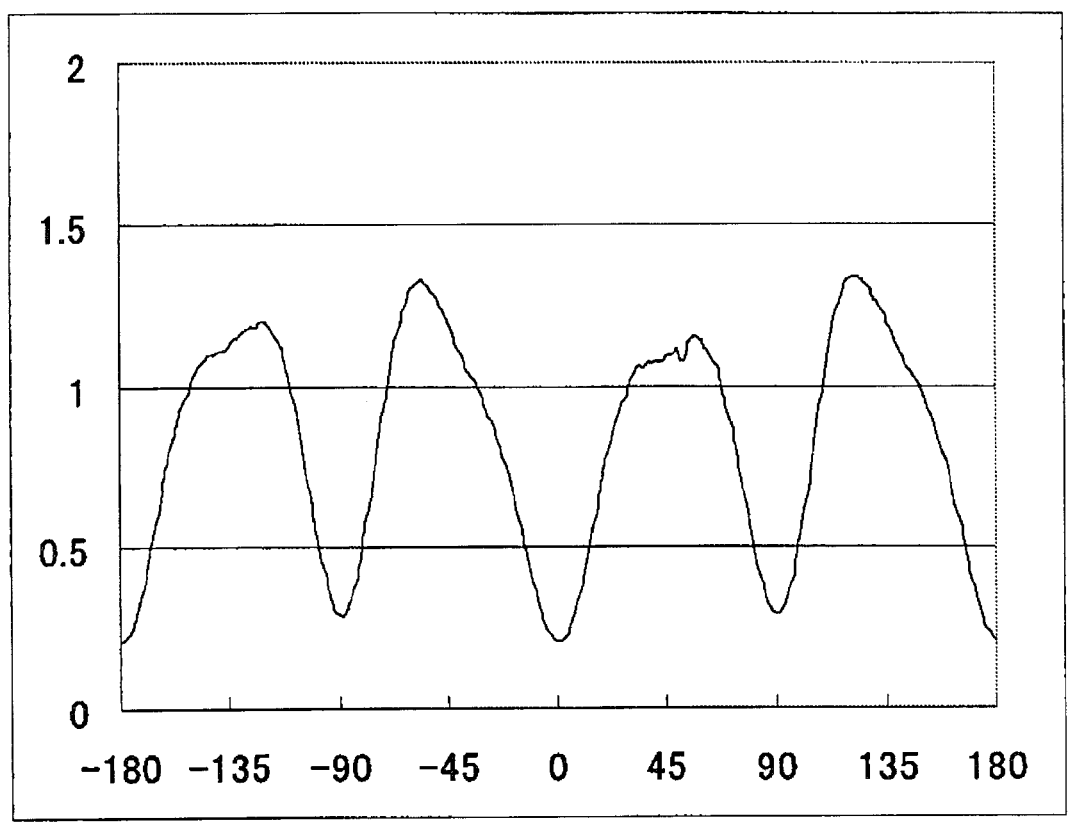
FIG. 9 is a graph illustrating brightness in a black display measured in Comparative Example 1.

The contrast of the obtained liquid crystal panel (C1C) was determined following the evaluation method described above. Table 1 below shows the results. FIG. 8 shows the measurement results of color shift (xy chromaticity diagram), and FIG. 9 shows the measurement results of brightness in a black display.

COMPARATIVE EXAMPLE 2

Production of a Liquid Crystal Panel (C2C)

A liquid crystal panel (C2C) was produced in the same way as in Example 1, except for attaching the retardation film integrated with a polarizing plate (1B) and the retardation film integrated with a polarizing plate (1A) so that the retardation film integrated with a polarizing plate (1B) was on a viewer side and the retardation film integrated with a polarizing plate (1A) was on a backlight side.

(Evaluation)

In the obtained liquid crystal panel (C2C), a contrast was obtained in accordance with the evaluation method, and knick evaluation was performed. Table 1 shows the results.

TABLE 1

|  | Oblique contrast | Front contrast | Knick |
|---|---|---|---|
| Example 1 | 87 | 2025 | A |
| Example 2 | 87 | 2025 | A |
| Example 3 | 87 | 2025 | B |
| Comparative Example 1 | 63 | 1820 | — |
| Comparative Example 2 | 81 | 1848 | A |
| Example 4 | 87 | 2025 | A |
| Example 5 | 80 | 2011 | A |
| Comparative Example 3 | 59 | 1830 | — |
| Comparative Example 4 | 66 | 1851 | — |

EXAMPLE 4

Production of a Retardation Film Integrated with a Polarizing Plate (2A)

Figure 10:
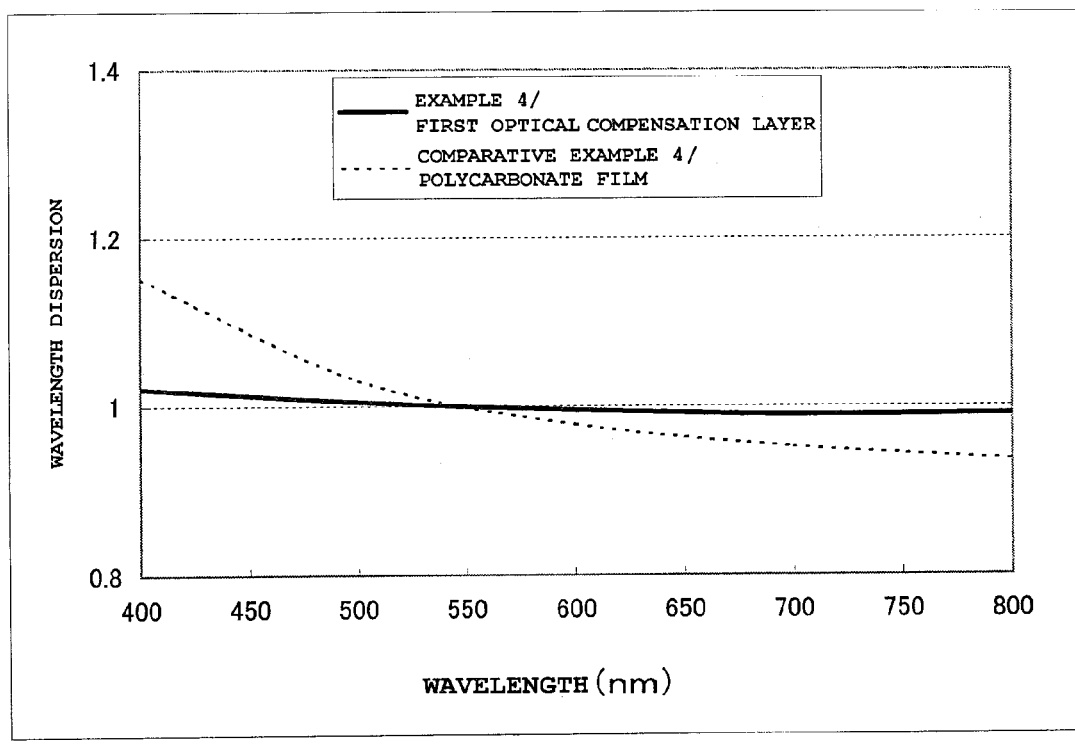
FIG. 10 is a graph illustrating wavelength dispersion properties of a first optical compensation layer of Example 4 and a polycarbonate film of Comparative Example 4.

A norbornene-based film (Arton (trade name) manufactured by JSR, thickness: 130 μm) was subjected to fixed-end uniaxial stretching by 3 times at 150° C. in a TD direction, whereby a first optical compensation layer was produced. The first optical compensation layer had a thickness of 43 μm, and an Nz of 1.34 (Rth=161 nm, Δnd=120 nm). Further, the first optical compensation layer had Δnd(380) of 124 nm, Δnd (550) of 120 nm, and Δnd(780) of 119 nm, and the difference between the maximum and the minimum values of Δnd at 380 nm to 780 nm of 5 nm. FIG. 10 shows wavelength dispersion properties of an in-plane retardation of the obtained first optical compensation layer. The wavelength dispersion (Y-axis) in FIG. 10 is Δnd(λ)/Δnd(550). In addition, the photoelastic coefficient of the first optical compensation layer was $6 \times 10^{-12}$ (m$^2$/N).

The polarizing plate (SIG1432 (trade name) manufactured by Nitto Denko Corporation) and the first optical compensation layer were attached so that an absorption axis of the polarizing plate was perpendicular to a slow axis of the first optical compensation layer, using the polyvinyl alcohol-based adhesive (thickness: 0.1 μm) obtained in Reference Example 2, whereby a retardation film integrated with a polarizing plate (2A) was produced.

(Production of a Retardation Film Integrated with a Polarizing Plate (3B))

Figure 11:
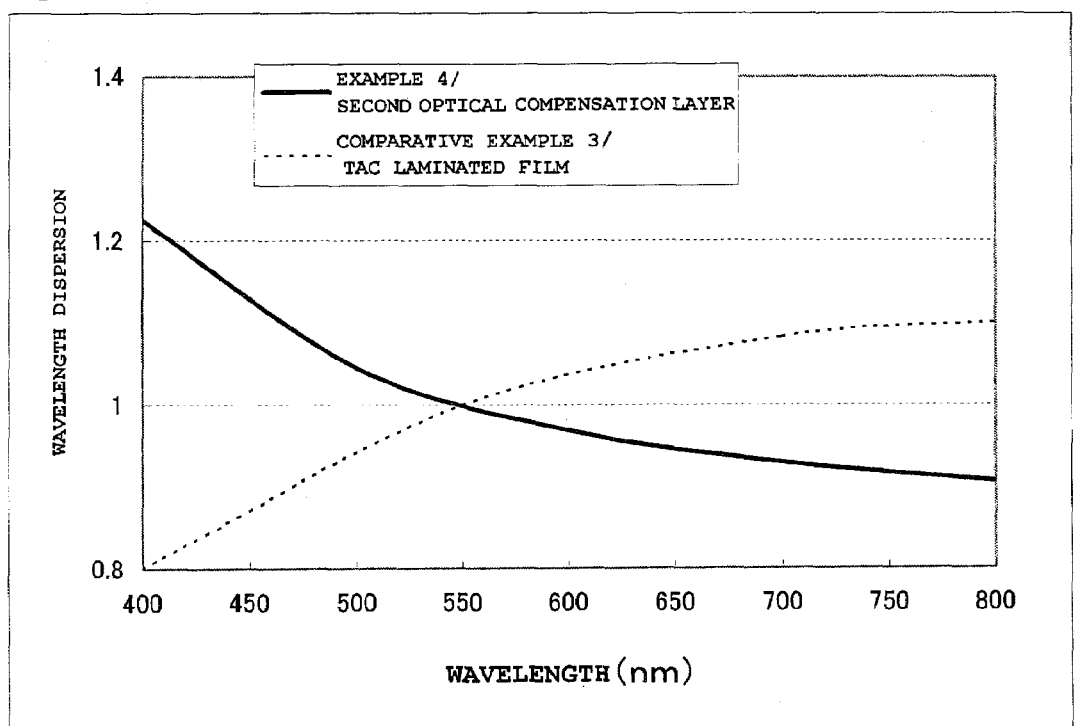
FIG. 11 is a graph illustrating wavelength dispersion properties of a second optical compensation layer of Example 4 and a TAC laminated film of Comparative Example 3.

A solution (concentration: 15% by weight) in which polyimide synthesized from 2,2'-bis(3,4-dicarboxyphenyl)hexafluoropropane) and 2,2'-bis(trifluoromethyl)-4,4'-diaminobiphenyl was dissolved in cyclohexanone was applied to a PET film (thickness: 50 μm) to a thickness of 30 μm. After that, the resultant PET film was dried at 100° C. for 10 minutes, whereby a polyimide layer (second optical compensation layer) with a thickness of about 4.5 μm was obtained on the PET film. The refractive index profile of the obtained polyimide layer (second optical compensation layer) was nx=ny>nz. Further, the obtained polyimide layer (second optical compensation layer) was transferred to a glass plate via a pressure-sensitive adhesive, and the retardation of the polyimide layer (second optical compensation layer) was measured to obtain Δnd=0.3 nm and Rth=182 nm. Further, the obtained polyimide layer (second optical compensation layer) had Rth(380) of 213 nm, Rth(550) of 187 nm, and Rth(780) of 170 nm. FIG. 11 shows wavelength dispersion properties of a thickness direction retardation when light was incident upon the obtained polyimide layer (second optical compensation layer) at 40°. The wavelength dispersion (Y-axis) in FIG. 11 is Rth(λ)/Rth(550).

The polyimide layer (second optical compensation layer) on the PET film was transferred to a polarizing plate (SIG1432 (trade name) manufactured by Nitto Denko Corporation) using an acrylic pressure-sensitive adhesive (thickness: 20 μm), whereby a retardation film integrated with a polarizing plate (3B) was obtained.

(Production of a Liquid Crystal Panel (4C))

A liquid crystal panel (4C) was produced in the same way as in Example 1, except for using the retardation film integrated with a polarizing plate (2A) in place of the retardation film integrated with a polarizing plate (1A) and using the retardation film integrated with a polarizing plate (3B) in place of the retardation film integrated with a polarizing plate (1B).

(Evaluation)

Figure 12:
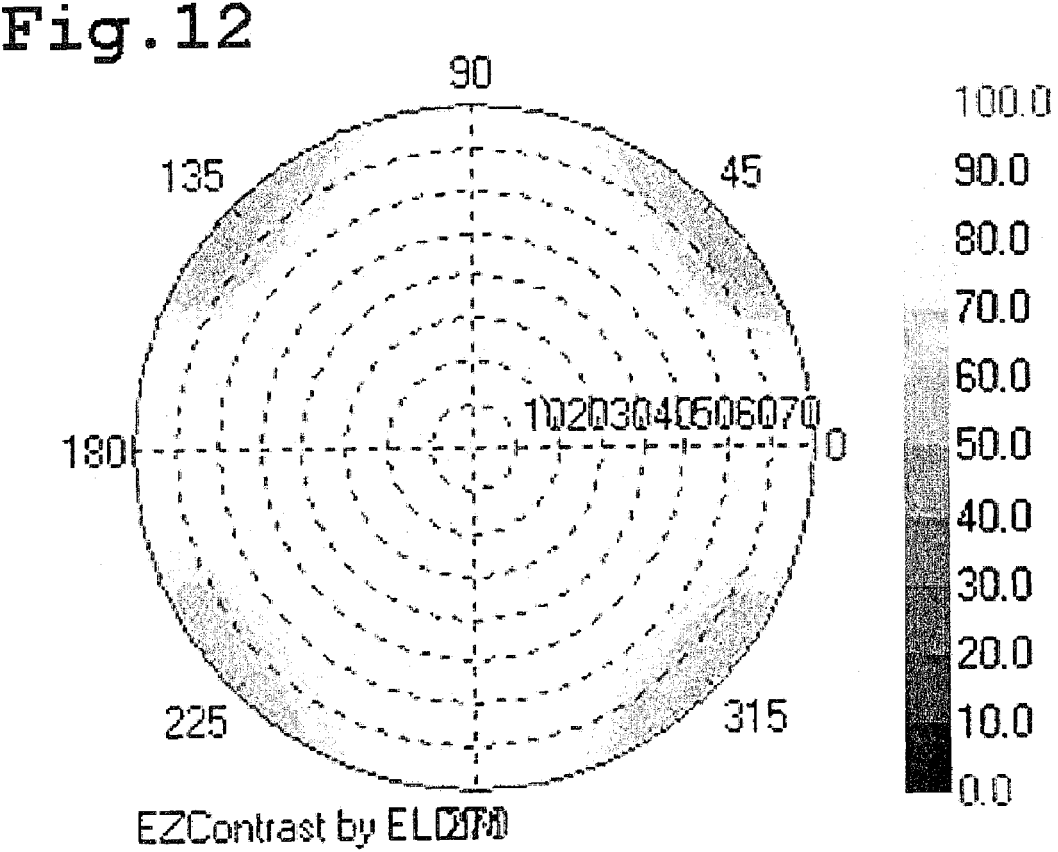
FIG. 12 is a contrast contour map illustrating viewing angle properties measured in Example 4.

In the obtained liquid crystal panel (4C), viewing angle properties were measured using EZ Contrast manufactured by ELDIM. FIG. 12 shows the results. Further, a contrast was obtained in accordance with the evaluation method, and knick evaluation was performed. Table 1 shows the results.

EXAMPLE 5

Production of a Retardation Film Integrated with a Polarizing Plate (3A)

A retardation film integrated with a norbornene-based resin film polarizing plate (3A) was produced in the same way as in Example 4, except for setting the stretching ratio of the norbornene-based resin film to be 1.8 times. The obtained first optical compensation layer had a thickness of 65 μm and an Nz of 1.61 (Rth=163 nm, Δnd=101 nm). Further, the first optical compensation layer had Δnd(380) of 104 nm, Δnd (550) of 101 nm, and Δnd(780) of 100 nm, and the difference between the maximum and the minimum values of Δnd at 380 nm to 780 nm of 4 nm. In addition, the photoelastic coefficient of the first optical compensation layer was $6 \times 10^{-12}$ (m$^2$/N). The wavelength dispersion properties of an in-plane retardation of the first optical compensation layer thus obtained were equal to those of the first optical compensation layer obtained in Example 4.

(Production of a Retardation Film Integrated with a Polarizing Plate (4B))

A retardation film integrated with a polarizing plate (4B) was produced in the same way as in Example 4. At this time, the thickness of a polyimide layer (second optical compensation layer) was about 4 μm. Further, the refractive index profile of the obtained polyimide layer (second optical compensation layer) was nx=ny>nz. Further, the obtained polyimide layer was transferred to a glass plate via a pressure-sensitive adhesive, and the retardation of the polyimide layer was measured to obtain Δnd=0.2 nm and Rth=169 nm. In addition, the obtained polyimide layer (second optical compensation layer) had Rth(380) of 215 nm, Rth(550) of 174 nm, and Rth(780) of 158 nm. The wavelength dispersion properties of an in-plane retardation of the second optical compensation layer thus obtained were equal to those of the second optical compensation layer obtained in Example 4.

(Production of a Liquid Crystal Panel (5C))

A liquid crystal panel (5C) was obtained in the same way as in Example 1, except for using the retardation film integrated with a polarizing plate (3A) in place of the retardation film integrated with a polarizing plate (1A) and using the retardation film integrated with a polarizing plate (4B) in place of the retardation film integrated with a polarizing plate (1B).

(Evaluation)

In the obtained liquid crystal panel (5C), viewing angle properties were measured using EZ Contrast manufactured by ELDIM.

Figure 13:
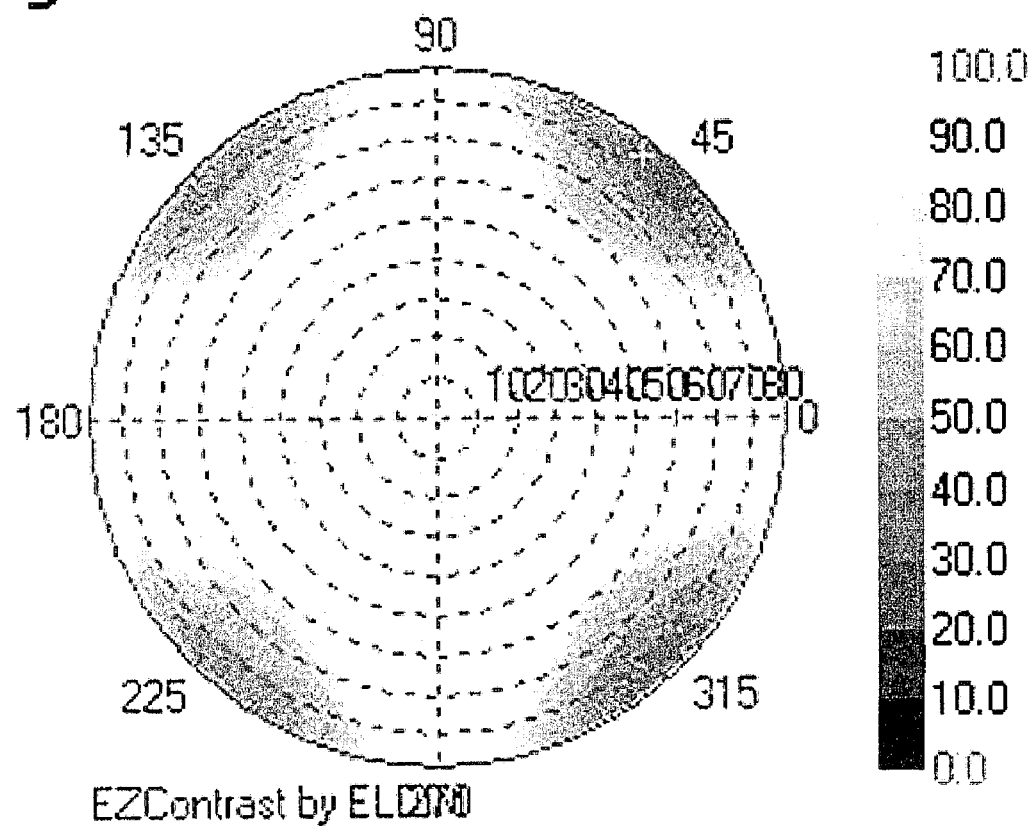
FIG. 13 is a contrast contour map illustrating viewing angle properties measured in Example 5.

FIG. 13 shows the results. Further, a contrast was obtained in accordance with the evaluation method, and knick evaluation was performed. Table 1 shows the results.

COMPARATIVE EXAMPLE 3

Production of a Retardation Film Integrated with a Polarizing Plate (C1B)

Three triacetylcellulose (TAC) films (TF-TAC (trade name) manufactured by Fuji Film Co., Ltd.) were attached to each other using an acrylic pressure-sensitive adhesive (thickness: 20 µm), whereby a laminated film was produced. The obtained laminated film had a thickness of 280 nm, Δnd of 2 nm, and Rth of 182 nm. Further, the laminated film exhibited reverse wavelength dispersion properties. FIG. 11 shows wavelength dispersion properties of a thickness direction retardation when light was incident upon the obtained laminated film at 40°.

The polarizing plate (SIG1432 (trade name) manufactured by Nitto Denko Corporation) and the laminated film were attached using an acrylic pressure-sensitive adhesive (thickness: 20 µm), whereby a retardation film integrated with a polarizing plate (C1B) was produced.

(Production of a Liquid Crystal Panel (C3C))

A liquid crystal panel (C3C) was produced in the same way as in Example 1, except for using the retardation film integrated with a polarizing plate (C1B) in place of the retardation film integrated with a polarizing plate (1B).

(Evaluation)

Figure 14:
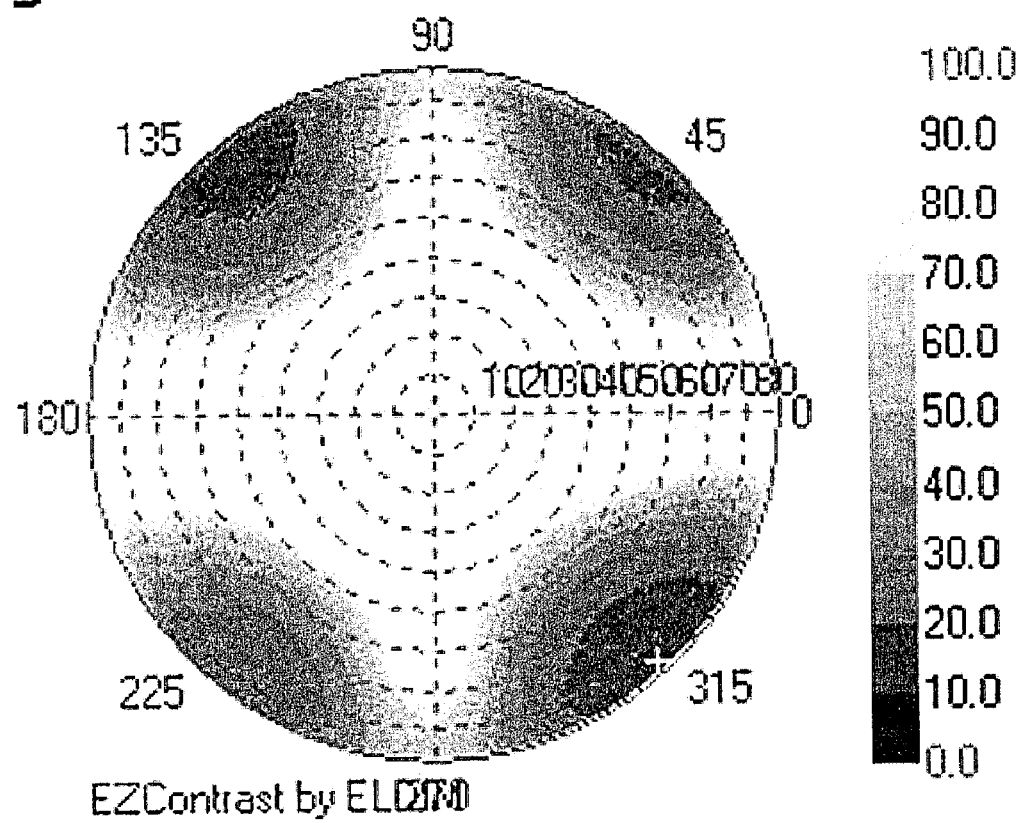
FIG. 14 is a contrast contour map illustrating viewing angle properties measured in Comparative Example 3.

In the obtained liquid crystal panel (C3C), viewing angle properties were measured using EZ Contrast manufactured by ELDIM. FIG. 14 shows the results. Further, a contrast was obtained in accordance with the evaluation method. Table 1 shows the results.

COMPARATIVE EXAMPLE 4

Production of a Retardation Film Integrated with a Polarizing Plate (C2A)

A polycarbonate film (NRF (trade name) manufactured by Nitto Denko Corporation, thickness: 60 µm) was subjected to free-end uniaxial stretching in a TD direction by 1.5 times at 160° C., whereby a retardation film was produced. The obtained retardation film had Δnd of 142 nm, Rth of 151 nm, and a photoelastic coefficient of $72 \times 10^{-12}$ ($m^2/N$). Further, the obtained retardation film exhibited positive wavelength dispersion properties. FIG. 10 shows wavelength dispersion properties of an in-plane retardation of the retardation film.

The polarizing plate (SIG1432 (trade name) manufactured by Nitto Denko Corporation) and the retardation film were attached to each other using an acrylic pressure-sensitive adhesive (thickness: 20 µm) so that an absorption axis of the polarizing plate was perpendicular to a slow axis of the retardation film, whereby a retardation film integrated with a polarizing plate (C2A) was produced.

(Production of a Liquid Crystal Panel (C4C))

A liquid crystal panel (C4C) was produced in the same way as in Example 1, except for using the retardation film integrated with a polarizing plate (C2A) in place of the retardation film integrated with a polarizing plate (1A).

(Evaluation)

Figure 15:
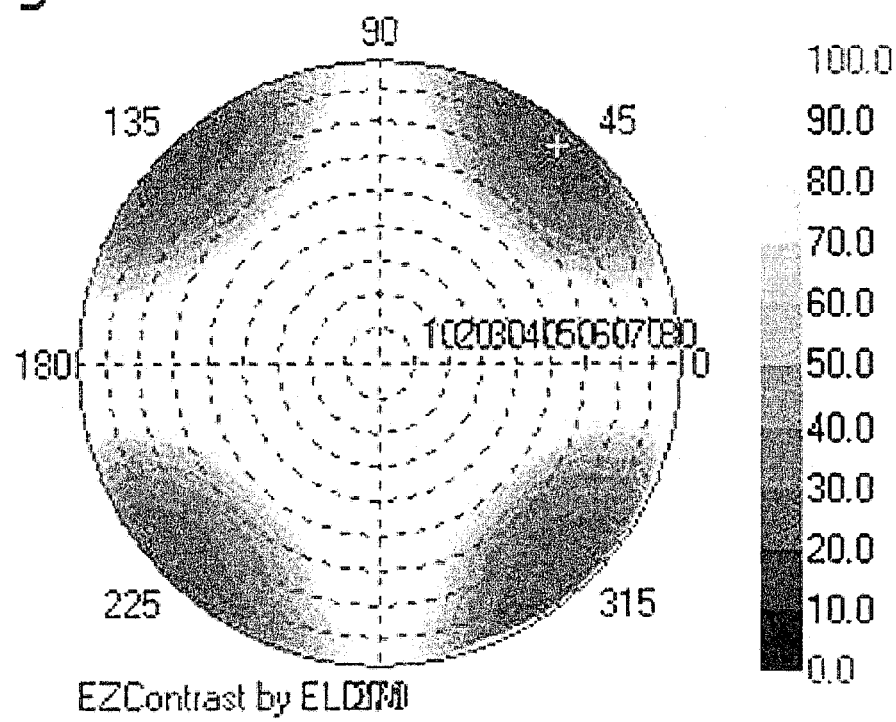
FIG. 15 is a contrast contour map illustrating viewing angle properties measured in Comparative Example 4.

In the obtained liquid crystal panel (C4C), viewing angle properties were measured using EZ Contrast manufactured by ELDIM. FIG. 15 shows the results. Further, brightness unevenness in the case of displaying an entire screen in a black display was measured using CA1500 manufactured by Konica Minolta Opt Product. FIG. 16 shows the results. Further, a contrast was obtained in accordance with the evaluation method. Table 1 shows the results.

Table 2 summarizes the entire configuration of the panels of Examples 1 to 5 and Comparative Examples 1 to 4. Note that the upper column of Table 2 shows a viewer side, and the lower column thereof shows a backlight side. An angle with assuming that the absorption axis of a polarizer on a backlight side is 0° is also shown.

TABLE 2

| | Example 1 (1C) | | | Example 2 (2C) | | | Example 3 (3C) | |
|---|---|---|---|---|---|---|---|---|
| 1A | Polarizing plate (TAC/Polarizer) | 90 | 1A | Polarizing plate (TAC/Polarizer) | 90 | 1A | Polarizing plate (TAC/Polarizer) | 90 |
| | First optical compensation layer (Norbornene) | 0 | | First optical compensation layer (Norbornene) | 0 | | First optical compensation layer (Norbornene) | 0 |
| | Liquid crystal cell | | | Liquid crystal cell | | | Liquid crystal cell | |
| 1B | Second optical compensation layer (Polyimide) | — | 2B | Second optical compensation layer (Polyimide (Formula II)) | — | 1B | Second optical compensation layer (Polyimide) | — |
| | TAC | — | | TAC | — | | TAC | — |
| | Polarizing plate (Polarizer/TAC) | 0 | | Polarizing plate (Polarizer/TAC) | 0 | | Polarizing plate (Polarizer/TAC) | 0 |

| | Comparative Example 1 (C1C) | | | Comparative Example 2 (C2C) | | | Example 4 (4C) | |
|---|---|---|---|---|---|---|---|---|
| | Polarizing plate (SEG1224) | 90 | 1B | Polarizing plate (TAC/Polarizer) | 90 | 2A | Polarizing plate (SIG1432) | 90 |
| | | | | TAC | — | | First optical compensation layer (Norbornene) | 0 |
| | | | | Second optical compensation | — | | | |

TABLE 2-continued

| C1A | Liquid crystal cell Polyimide layer TAC | — — | 1A | layer (Polyimide) Liquid crystal cell First optical compensation layer (Norbornene) | 90 | 3B | Liquid crystal cell Second optical compensation layer (Polyimide) | — |
|---|---|---|---|---|---|---|---|---|
| | Polarizing plate (Polarizer/TAC) | 0 | | Polarizing plate (Polarizer/TAC) | 0 | | Polarizing plate (SIG1432) | 0 |

| | Example 5 (5C) | | | Comparative Example 3 (C3C) | | | Comparative Example 4 (C4C) | |
|---|---|---|---|---|---|---|---|---|
| 3A | Polarizing plate (SIG1432) | 90 | 1A | Polarizing plate (TAC/Polarizer) | 90 | C2A | Polarizing plate (SIG1432) | 90 |
| | First optical compensation layer (Norbornene) | 0 | | First optical compensation layer (Norbornene) | 0 | | Polycarbonate film | 0 |
| 4B | Liquid crystal cell Second optical compensation layer (Polyimide) | — | C1B | Liquid crystal cell TAC laminated film | — | 1B | Liquid crystal cell Second optical compensation layer (Polyimide) | — |
| | Polarizing plate (SIG1432) | 0 | | Polarizing plate (SIG1432) | 0 | | TAC Polarizing plate (Polarizer/TAC) | — 0 |

As shown in Table 1, in the liquid crystal panel of the present invention, a neutral display having no color shift in all azimuth angle directions and having a high oblique contrast and a high front contrast is obtained. On the other hand, in the oblique contrast and the front contrast, a large decrease is observed in Comparative Examples 1 to 4. Further, as shown in FIGS. 6 to 9, in Example 1, the variation in x and y in an xy chromaticity diagram is smaller, and a brightness in a black display is lower, compared with those in Comparative Example 1. This means that the contrast of a liquid crystal panel is higher and a color shift is smaller in Example 1, compared with those in Comparative Example 1.

As shown in FIGS. 12 to 15, in Examples 4 and 5, white portions of contrast contour maps are larger than those in Comparative Examples 3 and 4. This means that a contrast is higher in all azimuth angle directions and visibility is more satisfactory in Examples 4 and 5, compared with those in Comparative Examples 3 and 4.

As shown in FIG. 16, Example 1 has, compared with Comparative Example 1, no light leakage and no brightness unevenness in a black display.

A liquid crystal panel and a liquid crystal display apparatus including the same according to the present invention can be used preferably for a personal computer, a liquid crystal television, a mobile telephone, a personal digital assistant (PDA), a projector, and the like.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel, comprising, in the stated order from a viewer side:
   a first polarizer;
   a first optical compensation layer;
   a liquid crystal cell;
   a second optical compensation layer; and
   a second polarizer, wherein:
   the first optical compensation layer has an absolute value of a photoelastic coefficient of $40 \times 10^{-12}$ (m$^2$/N) or less, has an in-plane retardation $\Delta$nd of 90 nm to 200 nm, has relationships of the following Expressions (1) and (2), and functions as a protective layer on a liquid crystal cell side of the first polarizer; and
   the second optical compensation layer has relationships of the following Expressions (3) and (4), $$\Delta\text{nd}(380)=\Delta\text{nd}(550)=\Delta\text{nd}(780) \quad (1)$$

$$nx>ny\geqq nz \quad (2)$$

$$\text{Rth}(380)>\text{Rth}(550)>\text{Rth}(780) \quad (3)$$

$$nx=ny>nz \quad (4).$$

2. A liquid crystal panel according to claim 1, wherein the first optical compensation layer has a difference between a maximum value and a minimum value of $\Delta$nd at a wavelength of 380 nm to 780 nm of 10 nm or less.

3. A liquid crystal panel according to claim 1, wherein the first optical compensation layer has an Nz coefficient in a range of 1.1 to 3.0.

4. A liquid crystal panel according to claim 1, wherein the first optical compensation layer has an Nz coefficient of more than 0.9 and less than 1.1.

5. A liquid crystal panel according to claim 1, wherein the first optical compensation layer is a film containing a cyclic olefin-based resin.

6. A liquid crystal panel according to claim 5, wherein the film containing the cyclic olefin-based resin is produced by fixed-end uniaxial stretching.

7. A liquid crystal panel according to claim 1, wherein the second optical compensation layer contains at least one non-liquid crystal material selected from a group consisting of polyamide, polyimide, polyester, polyetherketone, polyamideimide, and polyesterimide.

8. A liquid crystal panel according to claim 1, wherein the first optical compensation layer and the first polarizer are attached to each other with a water-soluble adhesive containing a polyvinyl alcohol-based resin.

9. A liquid crystal panel according to claim 8, wherein the water-soluble adhesive contains a metal compound colloid.

10. A liquid crystal panel according to claim 1, wherein the liquid crystal cell has a drive mode of one of a VA mode and an OCD mode.

11. A liquid crystal display apparatus comprising the liquid crystal panel according to claim 1.

* * * * *